US010133157B2

(12) United States Patent
Matsumoto et al.

(10) Patent No.: US 10,133,157 B2
(45) Date of Patent: Nov. 20, 2018

(54) IMAGING CONTROL DEVICE, IMAGING SYSTEM, IMAGING CONTROL METHOD, AND RECORDING MEDIUM

(71) Applicant: Olympus Corporation, Hachioji-shi, Tokyo (JP)

(72) Inventors: Saori Matsumoto, Tokyo (JP); Kensuke Ishii, Tokyo (JP); Arata Shinozaki, Tokyo (JP); Takayuki Nakatomi, Tokyo (JP); Yoshitaka Sato, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/828,424

(22) Filed: Nov. 30, 2017

(65) Prior Publication Data
US 2018/0088444 A1 Mar. 29, 2018

Related U.S. Application Data

(63) Continuation of application No. PCT/JP2015/067504, filed on Jun. 17, 2015.

(51) Int. Cl.
*G03B 17/18* (2006.01)
*H04N 5/232* (2006.01)

(52) U.S. Cl.
CPC ......... *G03B 17/18* (2013.01); *H04N 5/23206* (2013.01); *H04N 5/23216* (2013.01); *H04N 5/23222* (2013.01); *H04N 5/23241* (2013.01); *H04N 5/23245* (2013.01)

(58) Field of Classification Search
None
See application file for complete search history.

(56) References Cited

U.S. PATENT DOCUMENTS

| 2002/0145660 | A1 | 10/2002 | Kanade | |
| 2009/0185797 | A1* | 7/2009 | Ogasawara | G03B 15/05 396/59 |
| 2010/0118162 | A1 | 5/2010 | Saijo | |

(Continued)

FOREIGN PATENT DOCUMENTS

| JP | 2008-042462 | 2/2008 |
| JP | 2010-114522 | 5/2010 |

(Continued)

OTHER PUBLICATIONS

International Search Report ("ISR") to corresponding International Application No. PCT/JP2015/067504, dated Aug. 18, 2015 (2 pgs.), with translation (2 pgs.).

*Primary Examiner* — W B Perkey
(74) *Attorney, Agent, or Firm* — John C. Pokotylo; Pokotylo Pateny Services

(57) ABSTRACT

An imaging control device includes a first communication module, a second communication module, and a generation unit. The first communication module receives first image data from a master imaging device. The first image data is generated by the master imaging device on the basis of second imaging-setting information. The generation unit generates first imaging-setting information from the second imaging-setting information stored in a storage module. The second communication module transmits the first imaging-setting information to two or more slave imaging devices.

7 Claims, 12 Drawing Sheets

(56) References Cited

U.S. PATENT DOCUMENTS

| | | | | |
|---|---|---|---|---|
| 2011/0052165 A1* | 3/2011 | Watanabe | ............... | G03B 17/00 |
| | | | | 396/56 |
| 2013/0050514 A1 | 2/2013 | Nakamura | | |
| 2015/0036012 A1* | 2/2015 | Jiang | .................. | H04N 5/23206 |
| | | | | 348/211.3 |
| 2015/0271493 A1* | 9/2015 | Okazaki | ............. | H04N 5/23206 |
| | | | | 348/211.11 |
| 2017/0163871 A1* | 6/2017 | Irie | .................... | H04N 5/23206 |
| 2018/0088444 A1* | 3/2018 | Matsumoto | ............ | G03B 17/18 |
| 2018/0098035 A1* | 4/2018 | Bateman | ............ | H04N 5/23222 |

FOREIGN PATENT DOCUMENTS

| | | |
|---|---|---|
| JP | 2010-166218 | 7/2010 |
| JP | 2013-051519 | 3/2013 |
| JP | 2013-092822 | 5/2013 |
| JP | 2013-162190 | 8/2013 |
| JP | 2014-207650 | 10/2014 |

\* cited by examiner

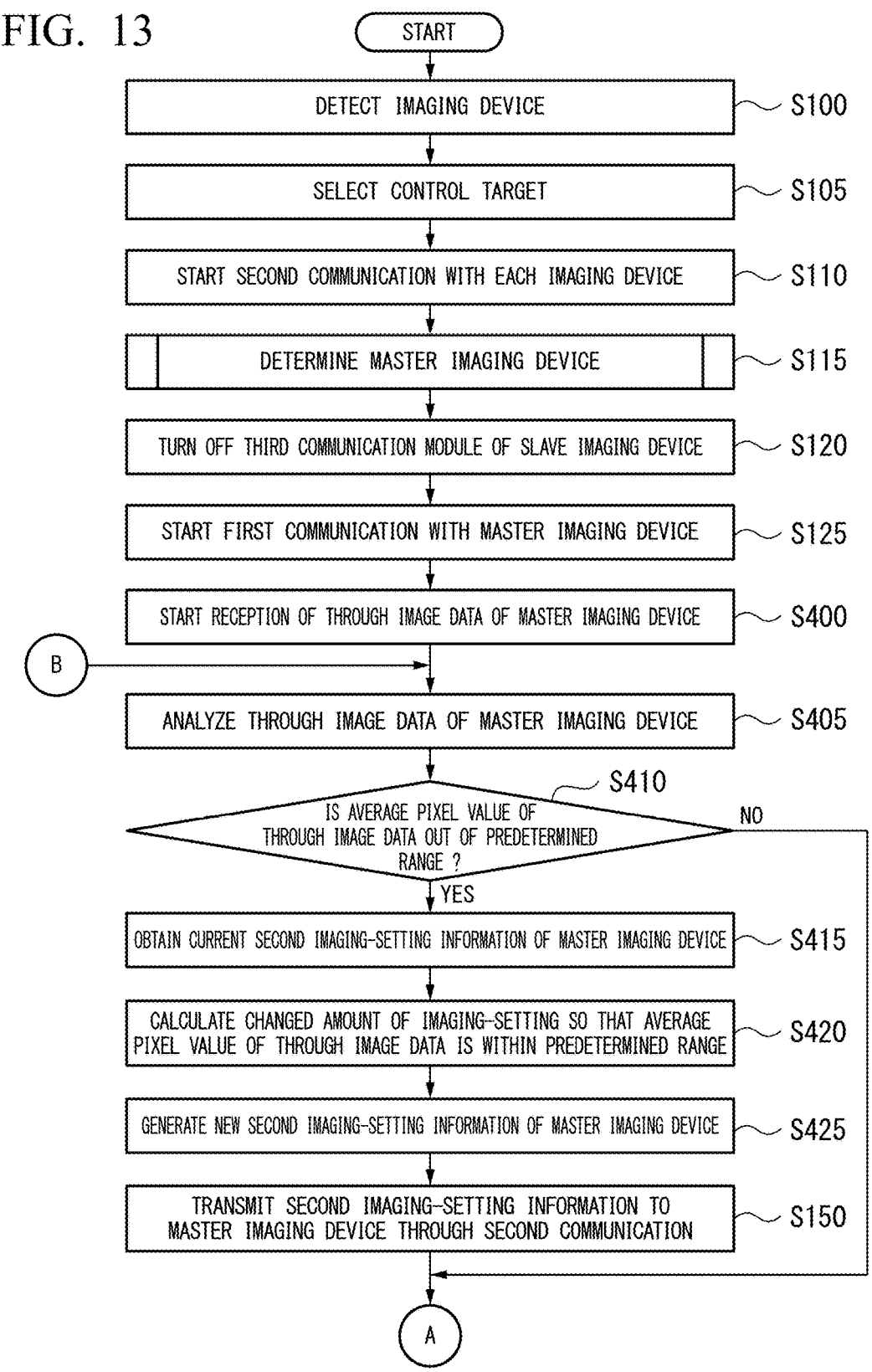

IMAGING CONTROL DEVICE, IMAGING SYSTEM, IMAGING CONTROL METHOD, AND RECORDING MEDIUM

BACKGROUND OF THE INVENTION

Field of the Invention

The present invention relates to an imaging control device, an imaging system, an imaging control method, and a recording medium.

This application is a continuation application based on International Patent Application No. PCT/JP2015/067504, filed Jun. 17, 2015, the content of which is incorporated herein by reference.

Description of Related Art

A system is known in which a control device controls a plurality of imaging devices. For example, a system that sets imaging conditions of a plurality of cameras to be the same is disclosed in Japanese Unexamined Patent Application, First Publication No. 2008-42462.

In the system disclosed in Japanese Unexamined Patent Application, First Publication No. 2008-42462, a camera 1 receives parameter information of a camera 2 and an image obtained by the camera 2 from the camera 2, and displays the image obtained by the camera 2. The camera 1 can switch between an image obtained by the camera 1 and the image obtained by the camera 2. A user compares the image obtained by the camera 1 with the image obtained by the camera 2. When the user selects the camera 2 on a screen and instructs execution of a setting change, parameters of the camera 1 are changed to parameters of the camera 2. Accordingly, the same parameters are set for the camera 1 and the camera 2.

SUMMARY OF THE INVENTION

According to a first aspect of the present invention, an imaging control device which controls three or more imaging devices includes a first communication module, a second communication module, and a generation unit. The first communication module performs communication in a first operation mode. The second communication module performs communication in a second operation mode. The generation unit generates first imaging-setting information. The first operation mode is an operation mode in which one node is unable to simultaneously maintain a communication connection with a plurality of nodes at a data link level. The second operation mode is an operation mode in which one node is able to simultaneously maintain a communication connection with a plurality of nodes at the data link level. A communication speed in the first operation mode is higher than a communication speed in the second operation mode. One of the three or more imaging devices is defined as a master imaging device. Two or more of the imaging devices other than the master imaging device among the three or more imaging devices are defined as slave imaging devices. The first communication module establishes a communication connection at the data link level with the master imaging device. The second communication module establishes a communication connection at the data link level with the two or more slave imaging devices. The first communication module receives first image data from the master imaging device. The first image data is generated by the master imaging device on the basis of second imaging-setting information. The generation unit generates the first imaging-setting information from the second imaging-setting information stored in a storage module. The second communication module transmits the first imaging-setting information to the two or more slave imaging devices.

According to a second aspect of the present invention, in the first aspect, the generation unit may perform any one of a first process and a second process. In the first process, the generation unit generates the first imaging-setting information from the second imaging-setting information stored in the storage module on the basis of a first instruction input to an input module after an image based on the first image data is displayed by a display module. The first instruction is an instruction regarding imaging-setting. In the second process, the generation unit analyzes the first image data and generates the first imaging-setting information from the second imaging-setting information stored in the storage module on the basis of an analysis result of the first image data.

According to a third aspect of the present invention, in the first aspect, the three or more imaging devices may include a third communication module and a fourth communication module. The third communication module performs communication in the first operation mode. The fourth communication module performs communication in the second operation mode. The third communication module is able to enter each of a first state and a second state. The first state is a normal state. The second state is any one of a state in which the third communication module operates with power consumption less than power consumption in the normal state and a state in which the third communication module stops an operation. The second communication module may transmit instruction information indicating an instruction to set the third communication module to the second state to the two or more slave imaging devices.

According to a fourth aspect of the present invention, in the second aspect, the imaging control device may further include a determination unit. The second communication module may receive second image data generated by the three or more imaging devices from the three or more imaging devices. The determination unit may determine, as the master imaging device, the imaging device that has generated the second image data indicated by a second instruction input to the input module, after the image based on the second image data is displayed by the display module. The second instruction may be an instruction to select the second image data generated by any one of the three or more imaging devices.

According to a fifth aspect of the present invention, an imaging system includes an imaging control device, and three or more imaging devices. The imaging control device includes a first communication module, a second communication module, and a generation unit. The first communication module performs communication in a first operation mode. The second communication module performs communication in a second operation mode. The generation unit generates first imaging-setting information. The first operation mode is an operation mode in which one node is unable to simultaneously maintain a communication connection with a plurality of nodes at a data link level. The second operation mode is an operation mode in which one node is able to simultaneously maintain a communication connection with a plurality of nodes at the data link level. A communication speed in the first operation mode is higher than a communication speed in the second operation mode. One of the three or more imaging devices is defined as a master imaging device. Two or more of the imaging devices other than the master imaging device among the three or more imaging devices are defined as slave imaging devices. The first communication module establishes a communication connection at the data link level with the master imaging device. The second communication module establishes a communication connection at the data link level with the two or more slave imaging devices. The first communication module receives first image data from the master imaging device. The first image data is generated by the master imaging device on the basis of second imaging-setting information. The generation unit generates the first imaging-setting information from the second imaging-setting information stored in a storage module. The second communication module transmits the first imaging-setting information to the two or more slave imaging devices. The three or more imaging devices include an imaging module, a control module, a third communication module, and a fourth communication module. The imaging module generates the first image data. The control module controls the imaging module. The third communication module performs communication in the first operation mode. The fourth communication module performs communication in the second operation mode. The third communication module of the master imaging device transmits the first image data to the imaging control device. The fourth communication module of two or more slave imaging devices receives the first imaging-setting information from the imaging control device. The control module of the two or more slave imaging devices performs imaging-setting of the imaging module on the basis of the first imaging-setting information.

According to a sixth aspect of the present invention, in an imaging control method, an imaging control device which controls three or more imaging devices executes a first step, a second step, a third step, a fourth step, and a fifth step. The imaging control device includes a first communication module and a second communication module. The first communication module performs communication in a first operation mode. The second communication module performs communication in a second operation mode. The first operation mode is an operation mode in which one node is unable to simultaneously maintain a communication connection with a plurality of nodes at a data link level. The second operation mode is an operation mode in which one node is able to simultaneously maintain a communication connection with a plurality of nodes at the data link level. A communication speed in the first operation mode is higher than a communication speed in the second operation mode. One of the three or more imaging devices is defined as a master imaging device. Two or more of the imaging devices other than the master imaging device among the three or more imaging devices are defined as slave imaging devices. The first step is a step of establishing a communication connection at the data link level with the master imaging device using the first communication module. The second step is a step of establishing a communication connection at the data link level with the two or more slave imaging devices using the second communication module. The third step is a step of receiving first image data from the master imaging device using the first communication module. The first image data is generated by the master imaging device on the basis of second imaging-setting information. The fourth step is a step of generating the first imaging-setting information from the second imaging-setting information stored in a storage module. The fifth step is a step of transmitting the first imaging-setting information to the two or more slave imaging devices using the second communication module.

According to a seventh aspect of the present invention, a non-transitory computer readable recording medium saves a program for causing a computer of an imaging control device which controls three or more imaging devices to execute a first step, a second step, a third step, a fourth step, and a fifth step. The imaging control device includes a first communication module and a second communication module. The first communication module performs communication in a first operation mode. The second communication module performs communication in a second operation mode. The first operation mode is an operation mode in which one node is unable to simultaneously maintain a communication connection with a plurality of nodes at a data link level. The second operation mode is an operation mode in which one node is able to simultaneously maintain a communication connection with a plurality of nodes at the data link level. A communication speed in the first operation mode is higher than a communication speed in the second operation mode. One of the three or more imaging devices is defined as a master imaging device. Two or more of the imaging devices other than the master imaging device among the three or more imaging devices are defined as slave imaging devices. The first step is a step of establishing a communication connection at the data link level with the master imaging device using the first communication module. The second step is a step of establishing a communication connection at the data link level with the two or more slave imaging devices using the second communication module. The third step is a step of receiving first image data from the master imaging device using the first communication module. The first image data is generated by the master imaging device on the basis of second imaging-setting information. The fourth step is a step of generating the first imaging-setting information from the second imaging-setting information stored in a storage module. The fifth step is a step of transmitting the first imaging-setting information to the two or more slave imaging devices using the second communication module.

BRIEF DESCRIPTION OF THE DRAWINGS

FIG. 13 is a flowchart showing a processing procedure of the imaging control device of the embodiment of the present invention.

DETAILED DESCRIPTION OF THE INVENTION

Figure 1:
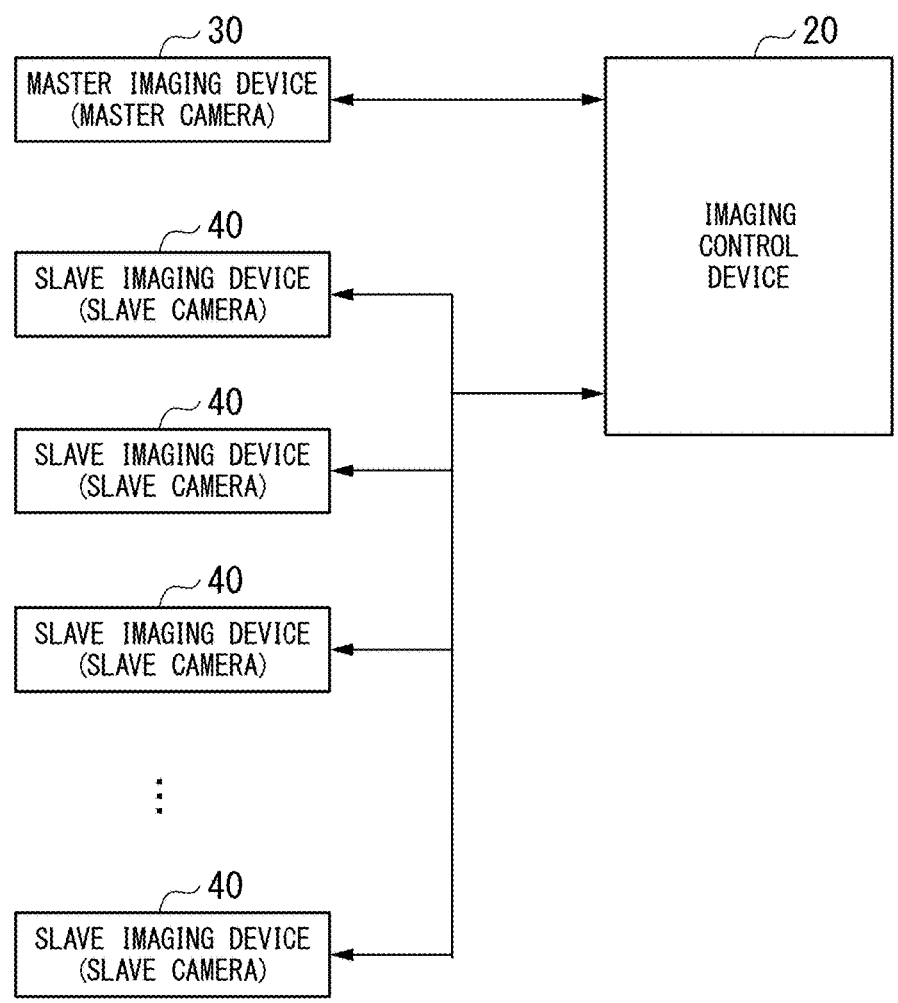
FIG. 1 is a block diagram showing a configuration of an imaging system of an embodiment of the present invention.

Embodiments of the present invention will be described with reference to the drawings. FIG. 1 shows a configuration of an imaging system 10 of an embodiment of the present invention. As shown in FIG. 1, the imaging system 10 includes one imaging control device 20, and a plurality of imaging devices. The plurality of imaging devices are three or more imaging devices, and include one master imaging device 30 (a master camera) and two or more slave imaging devices 40 (slave cameras). The master imaging device 30 and the slave imaging devices 40 are imaging devices having different roles. The master imaging device 30 is an imaging device serving as a reference of imaging-setting. The slave imaging device 40 is an imaging device in which imaging-setting is performed on the basis of the imaging-setting of the master imaging device 30. The imaging control device 20 performs the imaging-setting of the two or more slave imaging devices 40 on the basis of the imaging-setting of the master imaging device 30. The imaging control device 20 communicates with the master imaging device 30 and the two or more slave imaging devices 40.

Figure 2:
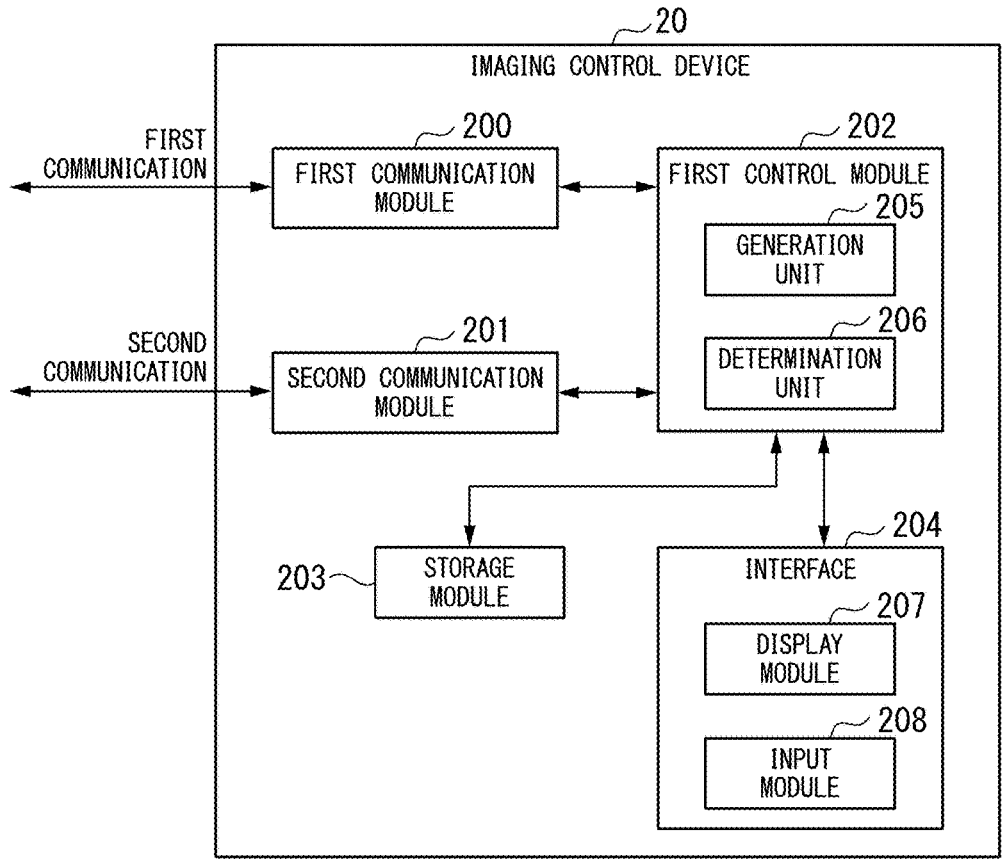
FIG. 2 is a block diagram showing a configuration of an imaging control device according to the embodiment of the present invention.

FIG. 2 shows a configuration of the imaging control device 20. As shown in FIG. 2, the imaging control device 20 includes a first communication module 200, a second communication module 201, a first control module 202, a storage module 203, and an interface 204.

The first communication module 200 performs communication (first communication) in a first operation mode. The second communication module 201 performs communication (second communication) in a second operation mode. The first operation mode is an operation mode in which one node is unable to simultaneously maintain a communication connection with a plurality of nodes at a data link level. The second operation mode is an operation mode in which one node is able to simultaneously maintain a communication connection with a plurality of nodes at the same time at the data link level. The communication speed of the first operation mode is faster than the communication speed of the second operation mode.

The data link level corresponds to a data link layer in an Open Systems Interconnection (OSI) reference model. The node communicates in the first operation mode or the second operation mode. The node is able to maintain a communication connection according to the first operation mode with only one node in one period of time. Further, the node is able to maintain a communication connection according to the second operation mode with a plurality of nodes in one period. Power consumption in the first operation mode may be higher than power consumption in the second operation mode.

The first communication module 200 and the second communication module 201 are communication devices (communication interfaces). The first communication module 200 and the second communication module 201 perform any one of wired communication and wireless communication. Hereinafter, an example in which the first communication module 200 and the second communication module 201 perform wireless communication will be described.

For example, the first operation mode is a mode in which WiFi (registered trademark) is used. For example, the second operation mode is a mode in which Bluetooth (registered trademark) Low Energy (BLE) is used. WiFi (registered trademark) corresponds to a plurality of standards. The plurality of standards are IEEE802.11a, IEEE802.11b, IEEE802.11g, IEEE802.11n, and IEEE802.11ac. A communication speed according to IEEE802.11b is the lowest speed among the communication speeds according to the plurality of standards. A maximum communication speed according to IEEE802.11b is 11 Mbps. The BLE corresponds to version 4.0, version 4.1, and version 4.2 of the Bluetooth (registered trademark). For example, a maximum communication speed according to version 4.2 of Bluetooth (registered trademark) is 1 Mbps. For example, power consumption due to WiFi (registered trademark) is 30 mW. For example, power consumption due to BLE is 10 mW or less.

The first control module 202 includes a generation unit 205, and a determination unit 206. The generation unit 205 generates first imaging-setting information. The determination unit 206 determines the imaging device serving as the master imaging device 30 among the three or more imaging devices. The first imaging-setting information is imaging-setting information that is set in the slave imaging device 40.

The first control module 202 is a processor such as a CPU. The first control module 202 may be hardware such as an application specific integrated circuit (ASIC).

For example, a function of the first control module 202 can be realized as a function of software by a computer of the imaging control device 20 loading and executing a program including commands that define the operation of the first control module 202. This program may be provided by a "computer readable recording medium" such as a flash memory. Further, the above-described program may be transmitted from a computer including a storage device or the like in which the program is stored to the imaging control device 20 via a transmission medium or by transmission waves in the transmission medium. The "transmission medium" for transmitting the program refers to a medium having a function of transmitting information, such as a network (communication network) such as the Internet or a communication line such as a telephone line. Further, the above-described program may realize some of the above-described functions. Further, the above-described program may be a differential file (a differential program) capable of realizing the above-described functions in combination with a program previously recorded in a computer.

The storage module 203 stores second imaging-setting information. The second imaging-setting information indicates an imaging-setting of the master imaging device 30. The storage module 203 is a volatile or nonvolatile memory. The storage module 203 may have a configuration independent of the imaging control device 20. That is, the storage module 203 is not essential to the imaging control device 20. The storage module 203 may store the first imaging-setting information.

The interface 204 includes a display module 207 and an input module 208. The display module 207 displays an image based on the image data. The display module 207 is a display device (a display interface) such as a liquid crystal display. The input module 208 inputs an instruction from a user to the imaging control device 20. The input module 208 is an input device (input interface) such as a button, a switch, a key, a mouse, a touch pad, or a touch panel. One or both of the display module 207 and the input module 208 may have a configuration independent of the imaging control device 20. That is, the display module 207 and the input module 208 are not essential to the imaging control device 20.

The imaging-setting information is information indicating parameters for setting an operation state of the imaging device. For example, the parameters are values such as an aperture, a focal length (zoom), sensitivity, white balance, exposure (shutter speed), an imaging distance, exposure, an imaging mode, an image processing parameter, and time. The imaging-setting information may be parameters related to a setting of continuous imaging. The imaging-setting information may be a parameter that specifies any one of a still image and a moving image. Alternatively, the imaging-setting information may be a parameter that designates an imaging-setting of each of the still images and the moving image.

Figure 3:
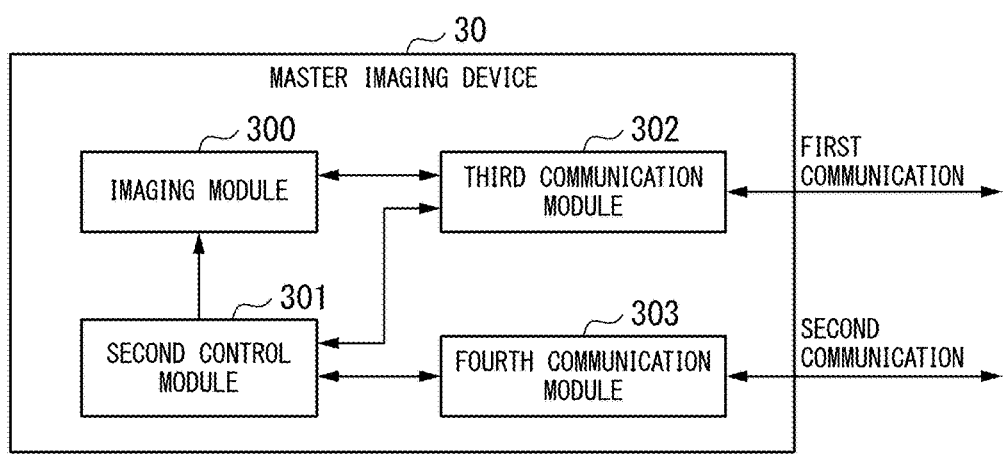
FIG. 3 is a block diagram showing a configuration of a master imaging device of the embodiment of the present invention.

FIG. 3 shows a configuration of the master imaging device 30. As shown in FIG. 3, the master imaging device 30 includes an imaging module 300, a second control module 301, a third communication module 302, and a fourth communication module 303.

The imaging module 300 generates image data (first image data and second image data). The imaging module 300 is an imaging element (image sensor). The first image data is image data that is generated by the master imaging device 30. The second image data is image data that is generated by the three or more imaging devices before the master imaging device 30 is determined.

The second control module 301 controls the imaging module 300 on the basis of information from the fourth communication module 303. The second control module 301 is a processor such as a CPU. The second control module 301 may be hardware such as an ASIC. For example, a function of the second control module 301 can be realized as a function of software by a computer of the master imaging device 30 reading and executing a program including instructions that define the operation of the second control module 301. A realization aspect of this program is the same as a realization aspect of the program realizing the function of the first control module 202.

The third communication module 302 performs communication (first communication) in the first operation mode. The fourth communication module 303 performs communication (second communication) in the second operation mode. The third communication module 302 and the fourth communication module 303 are communication devices (communication interfaces). The third communication module 302 and the fourth communication module 303 perform any one of wired communication and wireless communication. Hereinafter, an example in which the third communication module 302 and the fourth communication module 303 perform wireless communication will be described.

The two or more slave imaging devices 40 have the same configuration as the master imaging device 30. That is, the two or more slave imaging devices 40 have the imaging module 300, the second control module 301, the third communication module 302, and the fourth communication module 303.

The configuration of the two or more slave imaging devices 40 may not be the same as the configuration of the master imaging device 30. In this case, the master imaging device 30 and the slave imaging device 40 include at least the imaging module 300. Further, the master imaging device 30 can perform communication at least in the first operation mode, and the slave imaging device 40 can perform communication at least in the second operation mode. That is, the master imaging device 30 among the three or more imaging devices may include the imaging module 300 and the third communication module 302. Two or more of the three or more imaging devices may include the imaging module 300, the second control module 301, and the fourth communication module 303. The master imaging device 30 and the slave imaging device 40 may be of a lens interchangeable type. In this case, the imaging-setting information transmitted from the imaging control device 20 to the master imaging device 30 and the slave imaging device 40 may include information for controlling an interchangeable lens.

A schematic operation of the imaging control device 20 and the imaging device will be described. One of the three or more imaging devices is defined as the master imaging device 30 and two or more of the imaging devices other than the master imaging device 30 among the three or more imaging devices are defined as slave imaging devices 40. The first communication module 200 establishes a communication connection at the data link level with the master imaging device 30. The second communication module 201 establishes a communication connection at the data link level with the two or more slave imaging devices 40. The first communication module 200 receives first image data from the master imaging device 30. The first image data is generated by the master imaging device 30 on the basis of the second imaging-setting information. The generation unit 205 generates the first imaging-setting information from the second imaging-setting information stored in the storage module 203. The second communication module 201 transmits the first imaging-setting information to the two or more slave imaging devices 40.

The generation unit 205 performs one of a first process and a second process. In the first process, the generation unit 205 generates the first imaging-setting information from the second imaging-setting information stored in the storage module 203 on the basis of a first instruction input to the input module 208 by the user after an image based on the first image data is displayed by the display module 207. The first instruction is an instruction regarding imaging-setting input by the user. In the second process, the generation unit 205 analyzes the first image data, and generates the first imaging-setting information from the second imaging-setting information stored in the storage module 203 on the basis of an analysis result of the first image data.

The second communication module 201 may establish a communication connection at the data link level with the master imaging device 30, and perform communication with the master imaging device 30.

The third communication module 302 of the master imaging device 30 transmits the first image data to the imaging control device 20. The fourth communication modules 303 of the two or more slave imaging devices 40 receive the first imaging-setting information from the imaging control device 20. The second control modules 301 of the two or more slave imaging devices 40 perform imaging-setting of the imaging module 300 on the basis of the first imaging-setting information received by the fourth communication module 303.

As described above, the first communication module 200 receives the first image data from the master imaging device 30. The first communication module 200 or the second communication module 201 need not receive the image data from the two or more slave imaging devices 40. Therefore, the imaging control device 20 can reduce an amount of use of a communication bandwidth, and can reduce power consumption. The second communication module 201 may transmit the first imaging-setting information to the two or more slave imaging devices 40 without switching the communication connection with the two or more slave imaging devices 40. Therefore, the imaging control device 20 can perform the imaging-setting of the plurality of imaging devices at a high speed. Since the user can perform the imaging-setting of the plurality of imaging devices by operating only the imaging control device 20, effort of the imaging-setting is reduced. The two or more slave imaging devices 40 need not transmit the image data to the imaging control device 20. Therefore, the two or more slave imaging devices 40 can reduce power consumption.

The three or more imaging devices include the third communication module 302 and the fourth communication module 303. The third communication module 302 are able to enter each of a first state and a second state. The first state is a normal state. The second state is any one of a state in which the third communication module 302 operates with power consumption less than power consumption in the normal state and a state in which the third communication module 302 stops an operation. The second communication module 201 transmits instruction information indicating an instruction to set the third communication module 302 to the second state to the two or more slave imaging devices 40. For example, after the communication connection with two or more slave imaging devices 40 has been established and before the first imaging-setting information is transmitted, the second communication module 201 transmits the instruction information to the two or more slave imaging devices 40.

The fourth communication modules 303 of the two or more slave imaging devices 40 receive the instruction information. For example, after communication connection with the imaging control device 20 has been established and before the first imaging-setting information is received, the fourth communication modules 303 of the two or more slave imaging devices 40 receive the instruction information. The second control modules 301 of the two or more slave imaging devices 40 set the third communication module 302 to the second state on the basis of the instruction information. Therefore, the imaging control device 20 can reduce the power consumption of the two or more slave imaging devices 40.

The second communication module 201 receives the second image data generated by all of the three or more imaging devices from all of the three or more imaging devices. The second image data is image data that is simplified as compared with the first image data generated by the master imaging device 30. For example, the data amount of the second image data is smaller than the data amount of the first image data. After images (a plurality of images) based on the second image data of all of the imaging devices are displayed by the display module 207, the determination unit 206 determines the imaging device that has generated the second image data indicated by a second instruction input to the input module 208 by the user as the master imaging device 30. The second instruction is an instruction for selecting the second image data generated by any one of all of the three or more imaging devices.

The fourth communication module 303 transmits the second image data to the imaging control device 20. According to the above, the user may select the master imaging device 30 on the basis of the image based on the second image data.

Figure 4:
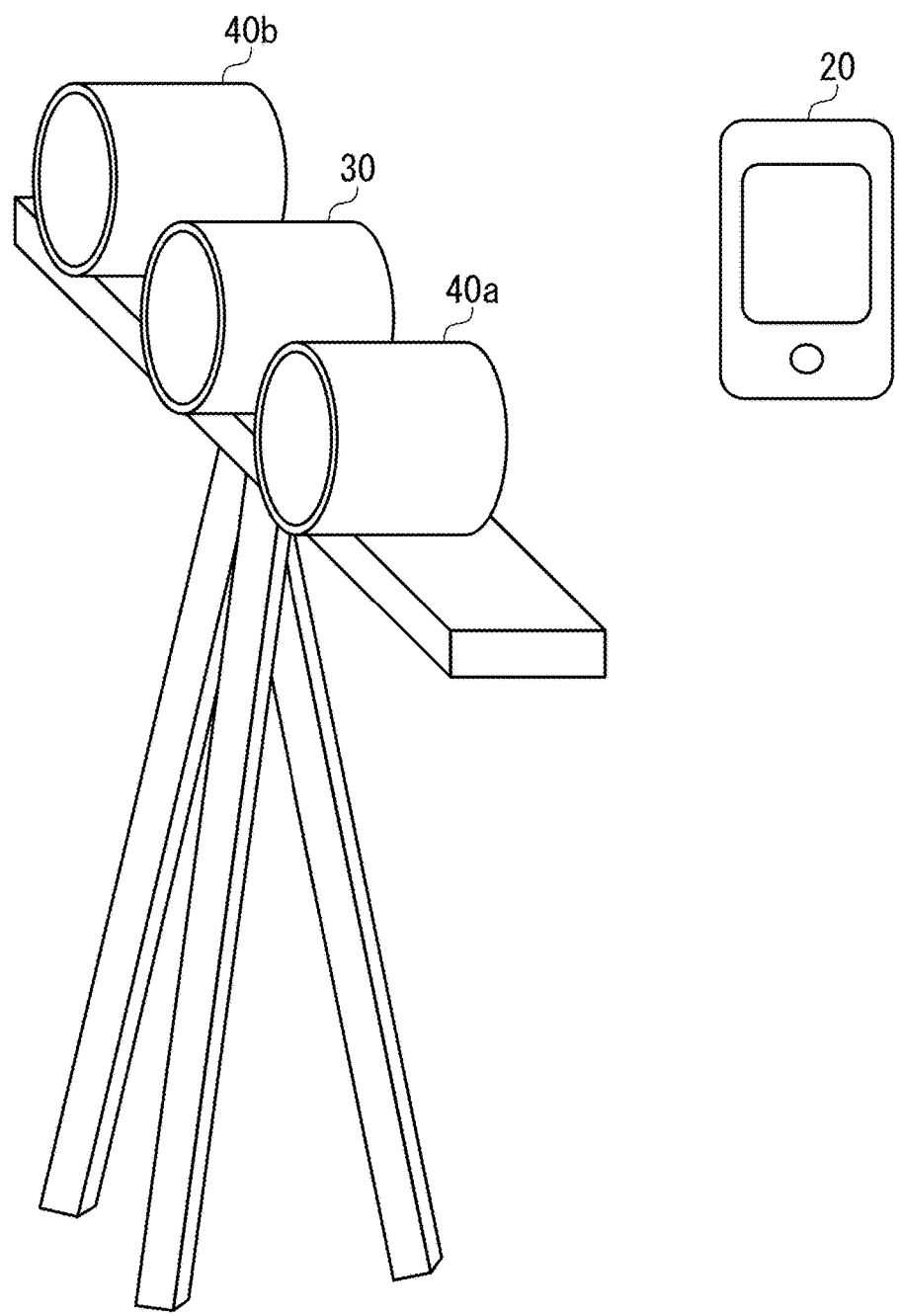
FIG. 4 is a schematic diagram showing a configuration of an imaging system of the embodiment of the present invention.
Figure 5:
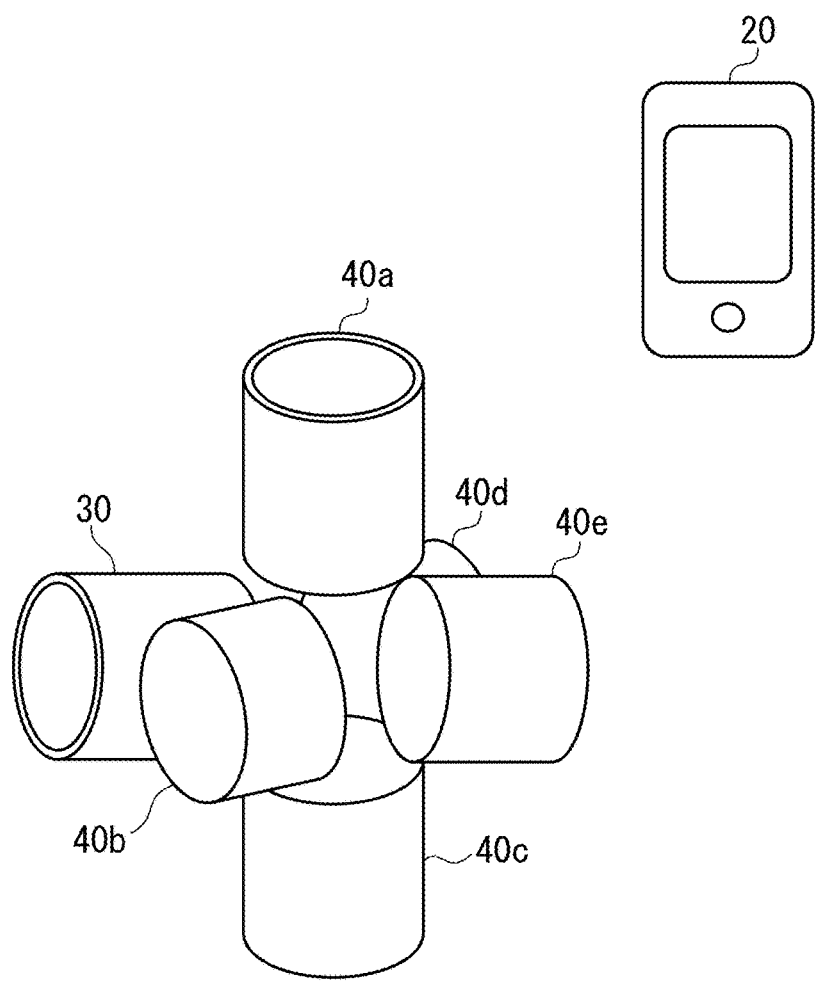
FIG. 5 is a schematic diagram showing a configuration of an imaging system of an embodiment of the present invention.
Figure 6:
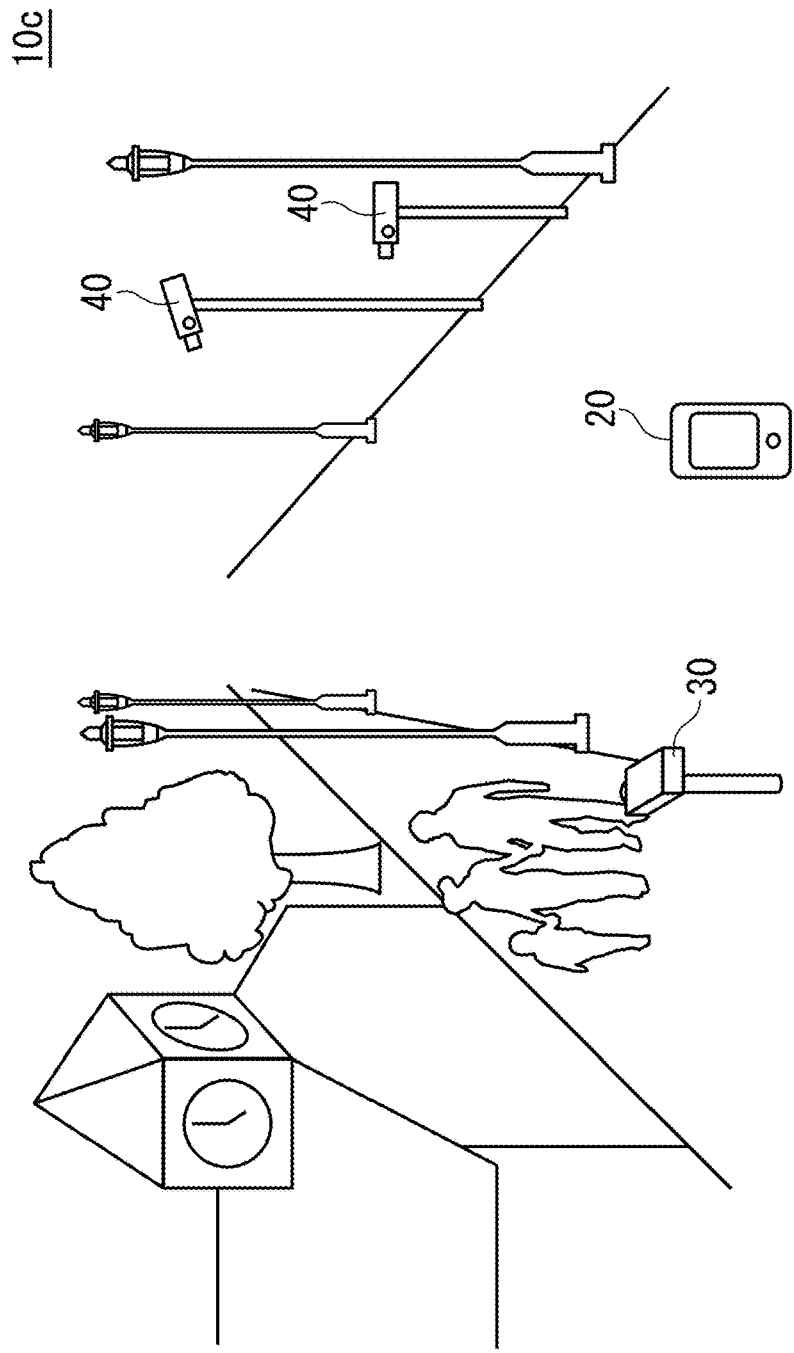
FIG. 6 is a schematic diagram showing a configuration of an imaging system of an embodiment of the present invention.

FIGS. 4 to 6 shows an example of the imaging system 10. FIG. 4 shows a configuration of an imaging system 10a that is a first example of the imaging system 10. The imaging system 10a includes an imaging control device 20, a master imaging device 30, a slave imaging device 40a, and a slave imaging device 40b.

The imaging control device 20 is a smartphone. The master imaging device 30, the slave imaging device 40a, and the slave imaging device 40b are cameras. Imaging directions of the master imaging device 30, the slave imaging device 40a, and the slave imaging device 40b are substantially the same. The slave imaging device 40a and the slave imaging device 40b are disposed on both sides of the master imaging device 30. The imaging system 10a can obtain a panoramic image or a stereo image.

FIG. 5 shows a configuration of an imaging system 10b that is a second example of the imaging system 10. The imaging system 10b includes an imaging control device 20, a master imaging device 30, a slave imaging device 40a, a slave imaging device 40b, a slave imaging device 40c, a slave imaging device 40d, and a slave imaging device 40e.

The imaging control device 20 is a smartphone. The master imaging device 30, the slave imaging device 40a, the slave imaging device 40b, the slave imaging device 40c, the slave imaging device 40d, and the slave imaging device 40e are cameras. Imaging directions of the respective cameras are different from one another. The master imaging device 30 and the slave imaging device 40e image in opposite directions. The slave imaging device 40a and the slave imaging device 40c image in opposite directions. The slave imaging device 40b and the slave imaging device 40d image in opposite directions. The imaging system 10b can obtain a 360° panoramic image by obtaining images from the respective imaging devices and connecting the obtained images.

FIG. 6 shows a configuration of an imaging system 10c that is a third example of the imaging system 10. The imaging system 10c includes an imaging control device 20, a master imaging device 30 and two slave imaging devices 40. The imaging control device 20 is a smartphone. The master imaging device 30 and the two slave imaging devices 40 are fixed cameras. The master imaging device 30 and the two slave imaging devices 40 are disposed at predetermined outdoor or indoor places. The imaging system 10c can function as a monitoring system. Further, the imaging system 10c can obtain a plurality of images of objects and persons imaged from different viewpoints.

The imaging system 10 may be a system capable of capturing the following images. For example, the respective imaging devices may perform imaging in different zoom states. The respective imaging devices may perform imaging with different exposure times. Some of the imaging devices may perform still image capturing, and the rest of the imaging devices may perform moving image capturing.

FIGS. 7 to 10 show a procedure of a process of the imaging control device 20 that includes the first process. A detailed process of the imaging control device 20 will be described.

The imaging control device 20 includes an application for performing a process regarding the imaging-setting. The application program is stored in the storage module 203. The first control module 202 reads the application program from the storage module 203 and starts an application. The first control module 202 performs a process defined by the application.

When the application is started, the first control module 202 detects imaging devices around the imaging control device 20 (step S100). For example, in step S100, the first control module 202 receives device information that is transmitted by the imaging device using the second communication module 201. The received device information includes an ID and connection information on the imaging device. The ID of the imaging device is capable of identifying the imaging device. For example, the ID of the imaging device is a Universally Unique Identifier (UUID). The connection information on the imaging device is used to establish the communication connection. For example, the connection information on the imaging device indicates a service. The first control module 202 detects the ID and the connection information on the imaging device from the received device information. The ID and the connection information on the detected imaging device are stored in the storage module 203. At a point in time of step S100, communication connection in the second operation mode between the imaging control device 20 and the imaging device is not established.

In all of the three or more imaging devices, the process corresponding to step S100 is performed. The second control module 301 performs control to transmit a beacon using the fourth communication module 303. Thus, the fourth communication module 303 transmits the beacon.

After step S100, the first control module 202 selects three or more imaging devices that are control targets from among the imaging devices detected in step S100 (step S105). For example, in step S105, the first control module 202 selects imaging devices having predetermined IDs that have been registered in advance. The user may select the imaging device that is a control target. For example, the first control module 202 selects an imaging device on the basis of a selection instruction for the imaging device input to the input module 208. Information on the imaging device that is the control target is stored in the storage module 203.

After step S105, the first control module 202 performs control to connect to the three or more imaging devices selected in step S105 using the second communication module 201. Further, the first control module 202 performs control to start communication (second communication) in the second operation mode using the second communication module 201 (step S110). Thus, in step S110, the second communication module 201 connects to the three or more imaging devices selected in step S105, and starts communication in the second operation mode. That is, in step S110, the second communication module 201 establishes the communication connection at the data link level with two or more slave imaging devices 40, and establishes a communication connection at the data link level with one master imaging device 30. At a point in time of step S110, the master imaging device 30 and the slave imaging device 40 are not determined. In step S110, the second communication module 201 establishes a communication connection at the data link level with three or more imaging devices that can become two or more slave imaging devices 40 and one master imaging device 30. In step S110, the second communication module 201 establishes a communication connection using the connection information detected in step S100.

In the three or more imaging devices, the process corresponding to step S110 is performed. The second control module 301 performs control to connect to the imaging control device 20 using the fourth communication module 303. Further, the second control module 301 performs control to start communication in the second operation mode using the fourth communication module 303. Thus, the fourth communication module 303 connects to the imaging control device 20 and starts communication in the second operation mode.

Figure 9:
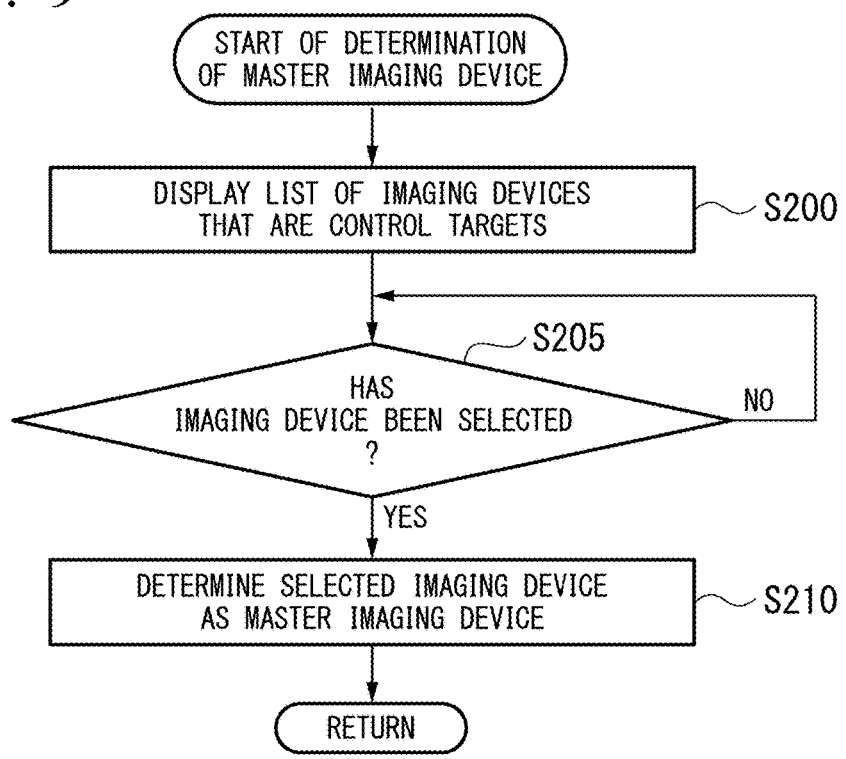
FIG. 9 is a flowchart showing a processing procedure of the imaging control device of the embodiment of the present invention.
Figure 10:
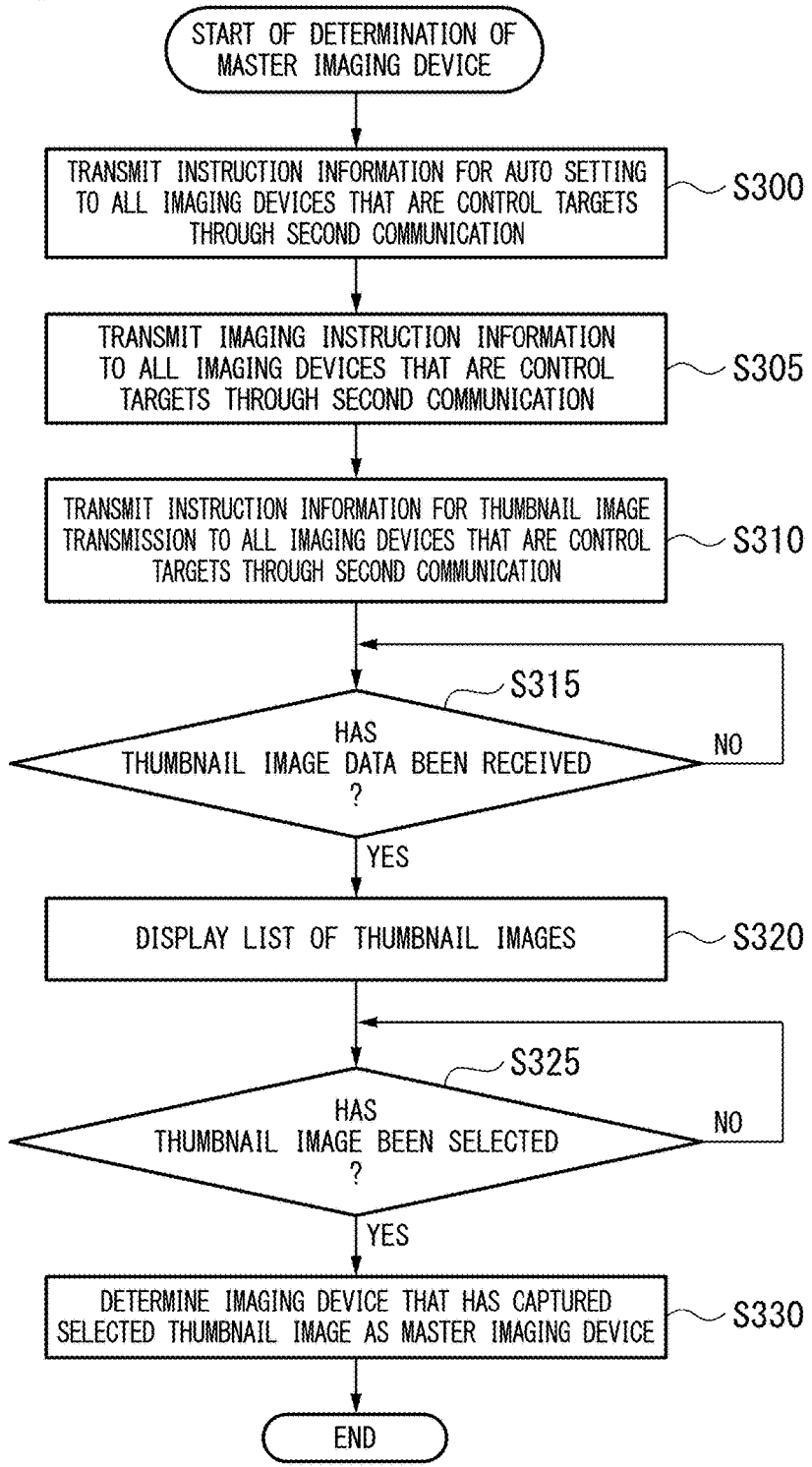
FIG. 10 is a flowchart showing a processing procedure of the imaging control device of the embodiment of the present invention.

After step S110, the first control module 202 (the determination unit 206) determines the master imaging device 30 (step S115). FIGS. 9 and 10 show a procedure of a process in step S115.

FIG. 9 shows a first method of determining the master imaging device 30. A detailed process of the imaging control device 20 regarding the determination of the master imaging device 30 will be described.

The first control module 202 (the determination unit 206) performs control to display a list of imaging devices that are control targets using the display module 207 (step S200). Thus, the display module 207 displays the list of the imaging devices that are control targets. For example, in step S200, the display module 207 displays a list of IDs of the imaging devices that are control targets.

After step S200, the first control module 202 (the determination unit 206) monitors a state of the input module 208 and determines whether or not the imaging device has been selected (step S205). The user selects one imaging device from the list of the imaging devices displayed by the display module 207. The user inputs information on the selected imaging device to the input module 208. The information input to the input module 208 indicates an instruction to select the imaging device. When the imaging device is not selected in step S205, the determination in step S205 is performed again.

When the imaging device has been selected in step S205, the first control module 202 (the determination unit 206) determines the selected imaging device as the master imaging device 30 (step S210). For example, in step S210, the first control module 202 (the determination unit 206) selects the ID of the imaging device indicated by the instruction input to the input module 208 and determines the imaging device having the ID as the master imaging device 30. Information on the master imaging device 30 is stored in the storage module 203.

By determining the master imaging device 30 in step S210, the imaging devices other than the master imaging device 30 among the imaging devices that are control targets are treated as slave imaging devices 40. In step S210, the first control module 202 (the determination unit 206) may determine, as the slave imaging devices 40, the imaging devices other than the selected imaging device among the imaging devices that are control targets. Information on the slave imaging devices 40 may be stored in the storage module 203. By performing step S210, the process shown in FIG. 9 ends.

The process shown in FIG. 9 may not include the communication with the imaging device. Therefore, if the process shown in FIG. 9 is performed in step S115, step S110 may be performed after step S115.

FIG. 10 shows a second method of determining the master imaging device 30. A detailed process of the imaging control device 20 regarding the determination of the master imaging device 30 will be described.

The first control module 202 (the determination unit 206) performs control to transmit instruction information for an AUTO setting to all of the imaging devices that are control targets using the second communication module 201 (step S300). Thus, in step S300, the second communication module 201 transmits the instruction information for an AUTO setting to all of the imaging devices that are control targets. All of the imaging devices that are control targets are imaging devices selected in step S105. All of the imaging devices that are control targets include one master imaging device 30 and two or more slave imaging devices 40. The instruction information for an AUTO setting is information for instructing the imaging devices to perform an automatic setting as imaging-setting.

In the three or more imaging devices, the process corresponding to step S300 is performed. The second control module 301 performs control to receive the instruction information for an AUTO setting using the fourth communication module 303. Thus, the fourth communication module 303 receives the instruction information for an AUTO setting. The second control module 301 performs imaging-setting for the imaging module 300 on the basis of the instruction information for an AUTO setting.

In step S300, the second communication module 201 may transmit the imaging-setting information indicating a predetermined imaging-setting to all of the imaging devices that are control targets. The fourth communication module 303 may receive the imaging-setting information indicating a predetermined imaging-setting. The second control module 301 may perform an imaging-setting of the imaging module 300 on the basis of the imaging-setting information indicating a predetermined imaging-setting.

After step S300, the first control module 202 (the determination unit 206) performs control to transmit imaging instruction information to all of the imaging devices that are control targets using the second communication module 201 (step S305). Thus, in step S305, the second communication module 201 transmits the imaging instruction information to all of the imaging devices that are control targets. The imaging instruction information is information for instructing each imaging device to capture a still image.

In the three or more imaging devices, a process corresponding to step S305 is performed. The second control module 301 performs control to receive the imaging instruction information using the fourth communication module 303. Thus, the fourth communication module 303 receives the imaging instruction information. The second control module 301 instructs the imaging module 300 to perform imaging on the basis of the imaging instruction information. The imaging module 300 captures a still image and generates image data. This image data includes data that is reduced as compared with normal still image data like thumbnail image data for displaying a thumbnail image.

After step S305, the first control module 202 (the determination unit 206) performs control to transmit instruction information for thumbnail image transmission to all of the imaging devices that are control targets using the second communication module 201 (step S310). Thus, in step S310, the second communication module 201 transmits the instruction information for thumbnail image transmission to all of the imaging devices that are control targets. The instruction information for thumbnail image transmission is information for instructing the imaging device to transmit thumbnail image data. Although the thumbnail image data is transmitted in the embodiment of the present invention, normal still image data, image data obtained by resizing, or the like may be transmitted. In this case, since a greater load in the second operation mode is applied as compared with transmission of the thumbnail image data, more transmission time is taken. However, since image quality is good, it is easy for a user to determine the master imaging device 30.

In the three or more imaging devices, the process corresponding to step S310 is performed. The second control module 301 performs control to receive the instruction information for thumbnail image transmission using the fourth communication module 303. Thus, the fourth communication module 303 receives the instruction information for thumbnail image transmission. The second control module 301 performs control to transmit the thumbnail image data to the imaging control device 20 using the fourth communication module 303 on the basis of the instruction information for thumbnail image transmission. Thus, the fourth communication module 303 transmits the thumbnail image data to the imaging control device 20.

After step S310, the first control module 202 (the determination unit 206) monitors the second communication module 201 to determine whether or not the thumbnail image data has been received from all of the imaging devices that are control targets (step S315). When the thumbnail image data is transmitted from the imaging device, the first control module 202 (the determination unit 206) performs control to receive the thumbnail image data (second image data) using the second communication module 201. Thus, the second communication module 201 receives the thumbnail image data. The received thumbnail image data is stored in the storage module 203 in association with an ID of the imaging device that is a connection partner. When the thumbnail image data is not received from one or more imaging devices that are control targets in step S315, the determination in step S315 is performed again.

When the thumbnail image data is received from all of the imaging devices that are control targets in step S315, the first control module 202 (the determination unit 206) performs control to display a list of thumbnail images based on the thumbnail image data using the display module 207 (step S320). Thus, in step S320, the display module 207 displays the list of thumbnail images based on the thumbnail image data. In step S320, the thumbnail images from all of the imaging devices that are control targets are displayed. For example, the thumbnail images from all of the imaging devices that are control targets are displayed simultaneously. The thumbnail images from all of the imaging devices that are control targets may be displayed sequentially.

After step S320, the first control module 202 (the determination unit 206) monitors a state of the input module 208 and determines whether or not the thumbnail image has been selected (step S325). The user selects one thumbnail image from the list of the thumbnail images displayed by the display module 207. The user inputs information on the selected thumbnail image to the input module 208. The information input to the input module 208 indicates an instruction to select the thumbnail image (thumbnail image data). When the thumbnail image is not selected in step S325, the determination in step S325 is performed again.

When the thumbnail image has been selected in step S325, the first control module 202 (the determination unit 206) determines the imaging device that has captured the selected thumbnail image as the master imaging device 30 (step S330). That is, after the thumbnail image based on the thumbnail image data is displayed by the display module 207, in step S330, the first control module 202 (the determination unit 206) determines, as the master imaging device 30, an imaging device that has generated the thumbnail image data indicated by the instruction input to the input module 208. The thumbnail image data and the ID of the imaging device are stored in the storage module 203. In step S330, the first control module 202 (the determination unit 206) selects the ID corresponding to the thumbnail image data indicated by the instruction input to the input module 208, and determines the imaging device having this ID as the master imaging device 30. Information on the master imaging device 30 is stored in the storage module 203.

Since the master imaging device 30 is determined in step S330, the imaging devices other than the master imaging device 30 among the imaging devices that are control targets are treated as slave imaging devices 40. In step S330, the first control module 202 (the determination unit 206) may determine, as the slave imaging devices 40, the imaging devices other than the selected imaging device among the imaging devices that are control targets. Information on the slave imaging devices 40 may be stored in the storage module 203. By performing step S330, the process shown in FIG. 10 ends.

The master imaging device 30 may be determined using a method other than the first determination method shown in FIG. 9 and the second determination method shown in FIG. 10. For example, an imaging device having a predetermined ID may be determined as the master imaging device 30.

An imaging device satisfying a predetermined condition may be determined as the master imaging device 30. For example, in the process shown in FIG. 10, the master imaging device 30 may be determined on the basis of an analysis result of the obtained thumbnail image data performed by the imaging control device 20 instead of the result of the user inputting an instruction to select a thumbnail image. For example, an imaging device that is imaging the brightest subject may be determined as the master imaging device 30. An imaging device of which communication quality is good and received radio wave strength detected by the imaging control device 20 is high may be determined as the master imaging device 30.

The master imaging device 30 may be appropriately changed. For example, an imaging device having the highest battery level may be determined as the master imaging device 30. When the battery level of the master imaging device 30 is lower than the battery level of the slave imaging device 40, the slave imaging device 40 may be changed to the master imaging device 30.

There may be two or more master imaging devices 30. When the imaging system 10 includes two or more master imaging devices 30, a partial imaging system includes one master imaging device 30, and two or more slave imaging devices 40 for which the imaging-setting is performed on the basis of imaging-setting of the master imaging device 30.

By ending the process shown in FIG. 9 or 10, step S115 ends. After step S115, the first control module 202 performs control to transmit instruction information for turning off the third communication module 302 to all of the slave imaging devices 40 using the second communication module 201 (step S120). Thus, in step S120, the second communication module 201 transmits the instruction information for turning off the third communication module 302 to all of the slave imaging devices 40. The instruction information for turning off the third communication module 302 is information for instructing the slave imaging device 40 to turn off the third communication module 302. That is, the instruction information for turning off the third communication module 302 indicates an instruction to set the third communication module 302 to an OFF state (stopped state). All of the slave imaging devices 40 include two or more slave imaging devices 40.

In all of the slave imaging devices 40, a process corresponding to step S120 is performed. The second control module 301 performs control to receive the instruction information for turning off the third communication module 302 using the fourth communication module 303. Thus, the fourth communication module 303 receives the instruction information for turning off the third communication module 302. The second control module 301 performs control to turn off the communication module 302 on the basis of the instruction information for turning off the third communication module 302. Thus, the third communication module 302 is turned off. That is, the third communication module 302 stops an operation. In this state, power consumption of the third communication module 302 is less than the power consumption in a normal state.

In step S120, the first control module 202 may perform control to transmit information on an instruction to perform a low-power-consumption operation of the third communication module 302 to all of the slave imaging devices 40 using the second communication module 201. That is, in step S120, the second communication module 201 may transmit the information on an instruction to perform a low-power-consumption operation of the third communication module 302 to all of the slave imaging devices 40. The information on an instruction to perform a low-power-consumption operation of the third communication module 302 is information for instructing the slave imaging device 40 to perform the low-power-consumption operation of the third communication module 302. That is, the information on an instruction to perform a low-power-consumption operation of the third communication module 302 indicates an instruction to set the third communication module 302 to an operation state of low-power-consumption.

In the slave imaging device 40, the second control module 301 performs control to receive the information on an instruction to perform a low-power-consumption operation of the third communication module 302 using the fourth communication module 303. Thus, the fourth communication module 303 receives the information on an instruction to perform the low-power-consumption operation of the third communication module 302. The second control module 301 performs control to operate the third communication module 302 at low-power-consumption on the basis of the information on an instruction to perform the low-power-consumption operation of the third communication module 302. Thus, the third communication module 302 operates at low-power-consumption. In this state, the power consumption of the third communication module 302 is less than the power consumption in a normal state. For example, the third communication module 302 operates in a sleep mode.

After step S120, the first control module 202 performs control to connect to the master imaging device 30 using the first communication module 200. Further, the first control module 202 performs control to start the communication (first communication) using the first communication module 200 in the first operation mode (step S125). Thus, in step S125, the first communication module 200 connects to the master imaging device 30, and starts communication in the first operation mode. In step S125, the first communication module 200 establishes a communication connection at the data link level with the master imaging device 30. In step S125, the first communication module 200 establishes a communication connection using authentication information of WiFi (registered trademark) set in advance as connection information. The authentication information is stored in the storage module 203 in advance.

In the master imaging device 30, a process corresponding to step S125 is performed. The second control module 301 performs control to connect the imaging control device 20 using the third communication module 302. Further, the second control module 301 performs control to start communication using the third communication module 302 in the first operation mode. Thus, the third communication module 302 connects to the imaging control device 20 and starts communication in the first operation mode.

After step S125, the first control module 202 performs control to start reception of the through image data of the master imaging device 30 using the first communication module 200. Further, the first control module 202 performs control to start displaying the through image using the display module 207 (step S130). Thus, in step S130, the first communication module 200 starts reception of the through image data of the master imaging device 30, and the display module 207 starts display of the through image. The through image data is data for displaying a through image (a live image). The master imaging device 30 generates the through image data for each frame. In step S130, the first communication module 200 receives the through image data (first image data) of the first frame from the master imaging device 30. The display module 207 displays the through image of the first frame on the basis of the through image data of the first frame. After step S130, the same process as described above is performed in a step that is not shown. Thus, the reception of the through image data of the second and subsequent frames and the display of the through image of the second and subsequent frames are performed. That is, the reception and the display of the through images are continuously performed.

In the master imaging device 30, the process corresponding to step S130 is performed. The second control module 301 instructs the imaging module 300 to start imaging. Thus, the imaging module 300 starts imaging to generate the through image data of the first frame. The second control module 301 performs control to transmit the through image data of the first frame to the imaging control device 20 using the third communication module 302. Thus, the third communication module 302 transmits the through image data of the first frame to the imaging control device 20. Further, the imaging module 300 sequentially generates through image data of the second and subsequent frames. The generated through image data is sequentially transmitted to the imaging control device 20.

The through image data is generated by the master imaging device 30 performing imaging control on the basis of the second imaging-setting information. That is, the imaging module 300 of the master imaging device 30 generates through image data on the basis of the second imaging-setting information. Before imaging is started, the second control module 301 performs imaging-setting based on the second imaging-setting information with respect to the imaging module 300. The second imaging-setting information is the same as the second imaging-setting information stored in the storage module 203 of the imaging control device 20.

For example, the second control module 301 performs control to transmit the second imaging-setting information to the imaging control device 20 using the third communication module 302 or the fourth communication module 303. Thus, the third communication module 302 or the fourth communication module 303 transmits the second imaging-setting information to the imaging control device 20. In step S125 or S110, the first control module 202 performs control to receive the second imaging-setting information using the first communication module 200 or the second communication module 201. Thus, the first communication module 200 or the second communication module 201 receives the second imaging-setting information. The received second imaging-setting information is stored in the storage module 203.

The imaging control device 20 may transmit the second imaging-setting information to the master imaging device 30. For example, the first control module 202 generates the second imaging-setting information. The second imaging-setting information may be the past second imaging-setting information stored in the storage module 203. The second imaging-setting information generated by the first control module 202 is stored in the storage module 203. In step S125 or S110, the first control module 202 performs control to transmit the second imaging-setting information to the master imaging device 30 using the first communication module 200 or the second communication module 201. Thus, the first communication module 200 or the second communication module 201 transmits the second imaging-setting information to the master imaging device 30. The second control module 301 performs control to receive the second imaging-setting information using the third communication module 302 or the fourth communication module 303. Thus, the third communication module 302 or the fourth communication module 303 receives the second imaging-setting information.

The second control module 301 performs imaging-setting with respect to the imaging module 300 on the basis of the second imaging-setting information.

Figure 11:
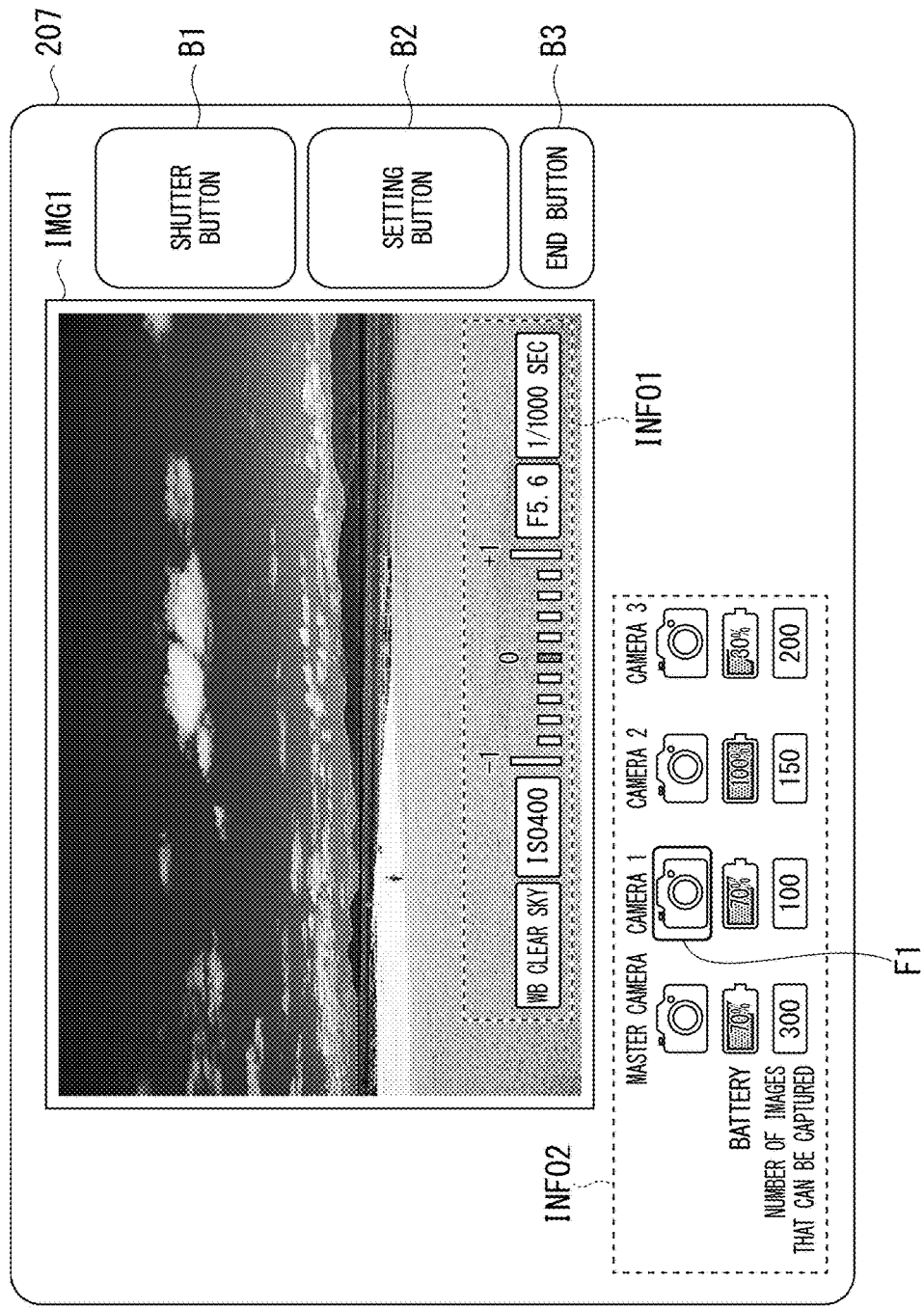
FIG. 11 is a reference diagram showing a screen of a display module included in the imaging control device of the embodiment of the present invention.

FIG. 11 shows a first example of the screen of the display module 207. The display module 207 displays a through image IMG1. The through image IMG1 is an image based on the through image data received from the master imaging device 30. Second imaging-setting information INFO1 of the master imaging device 30 is displayed to overlap the through image IMG1. The second imaging-setting information INFO1 includes information on parameters of white balance, sensitivity, exposure, an aperture, and a shutter speed.

The display module 207 is a touch panel. The display module 207 displays a shutter button B1, a setting button B2, and an end button B3. The user can operate the buttons. The buttons constitute the input module 208. The user can change the imaging-setting of the master imaging device 30 by touching and operating portions of white balance, sensitivity, exposure, an aperture, and a shutter speed of the second imaging-setting information INFO1. The portions of the second imaging-setting information INFO1 in the touch panel constitute the input module 208. Further, the user can set, in the slave imaging device 40, imaging-setting information that is the same as the second imaging-setting information of the master imaging device 30 by operating the setting button B2. After the imaging-setting has ended, an operation of the shutter button B1 is permitted. The user can simultaneously perform imaging in all of the master imaging device 30 and the slave imaging devices 40 by operating the shutter button B1.

The display module 207 displays imaging device information INFO2. The imaging device information INFO2 includes information indicating states of the master imaging device 30 (master camera) and the slave imaging devices 40 (a camera 1, a camera 2, and a camera 3). The imaging device information INFO2 includes a battery level, and the number of images that can be captured. This information is obtained by the second communication module 201 performing communication with each imaging device in the second operation mode. The imaging device information INFO2 includes a mark for designating a type of image. In FIG. 11, each camera captures a still image. When the imaging-setting is performed with respect to the slave imaging device 40 on the basis of the second imaging-setting information of the master imaging device 30, a frame F1 is displayed at a mark corresponding to the slave imaging device 40. When the setting button B2 has been pressed, the same imaging-setting as that of the master imaging device 30 is performed with respect to all of the slave imaging devices 40, and the frame F1 is displayed. Thus, the user can recognize that preparation of imaging has been completed.

Figure 12:
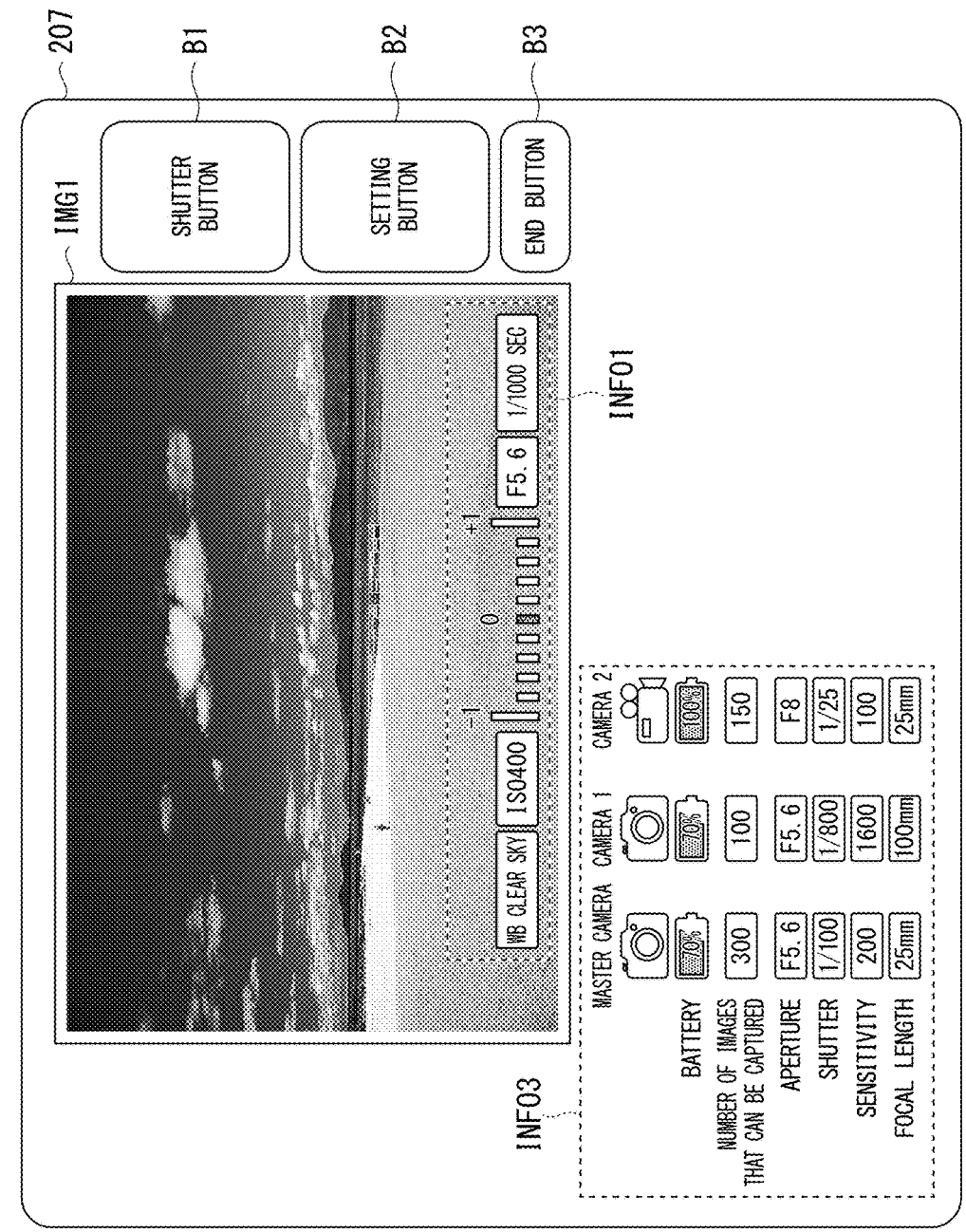
FIG. 12 is a reference diagram showing a screen of a display module included in the imaging control device of the embodiment of the present invention.

FIG. 12 shows a second example of the screen of the display module 207. In the screen shown in FIG. 12, a portion different from the portion shown in FIG. 11 will be described.

The display module 207 displays imaging device information INFO3. The imaging device information INFO3 includes imaging-setting information of the master imaging device 30 (a master camera) and the slave imaging device 40 (a camera 1 and a camera 2). The imaging device information INFO3 includes a battery level, and the number of images that can be captured. The imaging device information INFO3 includes the second imaging-setting information of the master imaging device 30 and the first imaging-setting information of the slave imaging device 40. The imaging device information INFO3 includes information on parameters of an aperture, a shutter speed, sensitivity, and a focal length. Further, the imaging device information INFO3 includes a mark for designating a type of image. In FIG. 12, the master camera and the camera 1 capture a still image and the camera 2 captures a moving image. In FIG. 12, at least a portion is different between the imaging-setting of the master imaging device 30 and the imaging-setting of the slave imaging device 40. In FIG. 12, imaging-settings of the two slave imaging devices 40 are different from each other.

In FIG. 12, the user can click a portion of the imaging device information INFO3 of each slave imaging device 40 while viewing the through image of the master imaging device 30 and the second imaging-setting information. Thus, the user changes the imaging-setting of the slave imaging device 40. By the user pressing the setting button B2, the imaging-setting of each slave imaging device 40 is reflected in each slave imaging device 40. The second imaging-setting information INFO1 is always reflected in the second imaging-setting information of the master imaging device 30 in the imaging device information INFO3.

For respects other than the above respect, the screen shown in FIG. 12 is the same as the screen shown in FIG. 11.

After step S130, the first control module 202 monitors the state of the input module 208 and determines whether or not the imaging-setting of the master imaging device 30 has been changed (step S135). The user can change the imaging-setting of the master imaging device 30 by operating a portion of the second imaging-setting information INFO1 in the touch panel. In step S135, the first control module 202 detects the operation of the portion of the second imaging-setting information INFO1 in the touch panel.

Figure 8:
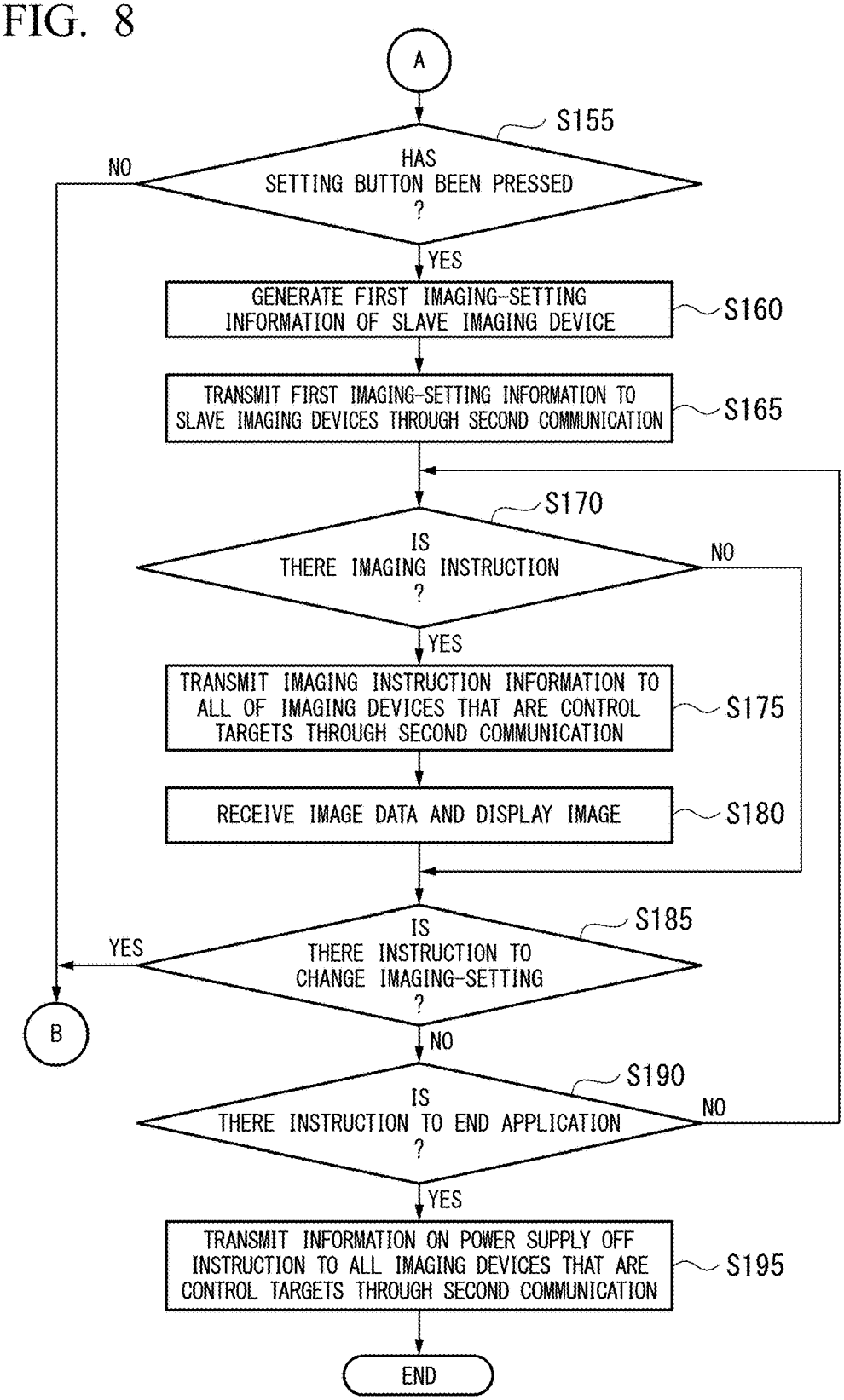
FIG. 8 is a flowchart showing a processing procedure of the imaging control device of the embodiment of the present invention.

When the imaging-setting of the master imaging device 30 has not been changed in step S135, step S155 shown in FIG. 8 is performed. When the imaging-setting of the master imaging device 30 has been changed in step S135, the first control module 202 detects changed content of the imaging-setting on the basis of a result of detecting the operation of the touch panel and, and displays the changed content of the imaging-setting (step S140).

After step S140, the first control module 202 generates new second imaging-setting information of the master imaging device 30 on the basis of the changed content of the imaging-setting (step S145). The generated second imaging-setting information is stored in the storage module 203.

After step S145, the first control module 202 performs control to transmit the second imaging-setting information to the master imaging device 30 using the second communication module 201 (step S150). Thus, the second communication module 201 transmits the second imaging-setting information to the master imaging device 30.

In the master imaging device 30, a process corresponding to step S150 is performed. The second control module 301 performs control to receive the second imaging-setting information using the fourth communication module 303. Thus, the fourth communication module 303 receives the second imaging-setting information. The second control module 301 performs imaging-setting based on the second imaging-setting information with respect to the imaging module 300. The first communication module 200 may transmit the second imaging-setting information and the third communication module 302 may receive the second imaging-setting information. Accordingly, the imaging-setting is changed, through image data captured on the basis of the changed imaging-setting is transmitted to the imaging control device 20, and a through image is displayed on the display module 207.

After step S150, the first control module 202 monitors the state of the input module 208 and determines whether or not the setting button B2 has been operated (step S155). Thus, the first control module 202 determines whether or not changing the imaging-setting of the master imaging device 30 has ended. In step S155, the first control module 202 detects the operation of the setting button B2. When the setting button B2 is not pressed in step S155, the determination in step S135 is performed again.

In step S155, when changing the imaging-setting of the master imaging device 30 has ended and the setting button B2 has been pressed, the first control module 202 (the generation unit 205) generates the first imaging-setting information of the slave imaging device 40 on the basis of the latest second imaging-setting information stored in the storage module 203 (step S160). That is, in step S160, the first control module 202 (the generation unit 205) generates the first imaging-setting information from the second imaging-setting information stored in the storage module 203 on the basis of instructions input to the input module 208 after the through image based on the through image data is displayed by the display module 207. The instructions input to the input module 208 are instructions that are input in steps S135 and S155. The instruction input in step S135 indicates that the imaging-setting is changed. The instruction input in step S155 indicates that changing the imaging-setting ends and the imaging-setting is set in the slave imaging device 40.

For example, in step S160, the first control module 202 (the generation unit 205) generates the first imaging-setting information that is the same as the second imaging-setting information from the latest second imaging-setting information stored in the storage module 203. Thus, the imaging-setting of the slave imaging device 40 becomes the same as the imaging-setting of the master imaging device 30. The imaging-setting of the slave imaging device 40 may be different from the imaging-setting of the master imaging device 30. For example, by shifting a value of a parameter indicated by the second imaging-setting information by a predetermined amount, a value of a parameter indicated by the first imaging-setting information may be set. For example, a focal length of the slave imaging device 40 may be set to four times the focal length of the master imaging device 30. A shutter speed of the slave imaging device 40 may be set to ¼ of the shutter speed of the master imaging device 30.

After step S160, the first control module 202 performs control to transmit the first imaging-setting information generated in step S160 to the two or more slave imaging devices 40 using the second communication module 201 (step S165). Thus, in step S165, the second communication module 201 transmits the first imaging-setting information generated in step S160 to the two or more slave imaging devices 40. For example, the second communication module 201 simultaneously transmits the first imaging-setting information to the two or more slave imaging devices 40. The second communication module 201 may sequentially transmit the first imaging-setting information to the two or more slave imaging devices 40. While the first imaging-setting information is being sequentially transmitted to the two or more slave imaging devices 40, communication connection at the data link level between the imaging control device 20 and the two or more slave imaging devices 40 is maintained.

Through the above process, the same first imaging-setting information is sent to the two or more slave imaging devices 40. As shown in FIG. 12, pieces of first imaging-setting information that are transmitted to the respective slave imaging devices 40 may be different.

After step S165, the first control module 202 monitors the state of the input module 208 and determines whether or not an imaging instruction has been input (step S170). The user can input the imaging instruction by operating the shutter button B1. In step S170, the first control module 202 detects the operation of the shutter button B1.

When the imaging instruction is not input in step S170, step S185 is performed. When the imaging instruction is input in step S170, the first control module 202 performs control to transmit imaging instruction information to all of the imaging devices that are control targets using the second communication module 201 (step S175). Thus, in step S175, the second communication module 201 transmits the imaging instruction information to all of the imaging devices that are control targets.

In the three or more imaging devices, a process corresponding to step S175 is performed. The second control module 301 performs control to receive the imaging instruction information using the fourth communication module 303. Thus, the fourth communication module 303 receives the imaging instruction information. The second control module 301 instructs the imaging module 300 to perform imaging on the basis of the imaging instruction information. The imaging module 300 captures a still image and generates image data. The imaging module 300 may captures a moving image.

After step S175, the first control module 202 performs control to receive the image data from the master imaging device 30 using the first communication module 200. Further, the first control module 202 performs control to display an image for a predetermined time using the display module 207 (step S180). Thus, in step S180, the first communication module 200 receives the image data from the master imaging device 30 and the display module 207 displays the image on the basis of received image data. The user can confirm the imaging-setting by confirming the displayed image.

In the master imaging device 30, the process corresponding to step S180 is performed. The second control module 301 performs control to transmit the image data to the imaging control device 20 using the third communication module 302. Thus, the third communication module 302 transmits the image data to the imaging control device 20.

In step S180, the second communication module 201 may receive the image data from the master imaging device 30. In step S180, the second communication module 201 may receive the image data from the two or more slave imaging devices 40, and the display module 207 may display images on the basis of the image data from the two or more slave imaging devices 40. After the predetermined time has elapsed, the first control module 202 performs a process of receiving through image data from the master imaging device 30 using the first communication module 200, and displays a through image. Thereafter, the reception of the through image data and the display of the through image are repeated.

After step S180, the first control module 202 monitors the state of the input module 208 and determines whether or not an instruction to change the imaging-setting has been input (step S185). In step S185, the first control module 202 detects an operation of the setting button B2. When the instruction to change the imaging-setting has been input in step S185, the determination in step S135 is performed again.

When the instruction to change the imaging-setting has not been input in step S185, the first control module 202 monitors the state of the input module 208, and determines whether or not an instruction to end the application has been input (step S190). The user can input the instruction to end the application by operating the end button B3. In step S190, the first control module 202 detects the operation of the end button B3. When the instruction to end the application has not been input in step S190, the determination in step S170 is performed again.

When the instruction to end the application has been input in step S190, the first control module 202 performs control to transmit information on a power-supply-OFF instruction to all of the imaging devices that are control targets using the second communication module 201 (step S195). Thus, in step S195, the second communication module 201 transmits the information on the power-supply-OFF instruction to all of the imaging devices that are control targets. The information on the power-supply-OFF instruction is information for instructing each imaging device to turn off a power supply.

In the three or more imaging devices, the process corresponding to step S195 is performed. The second control module 301 performs control to receive information on a power-supply-OFF instruction using the fourth communication module 303. Thus, the fourth communication module 303 receives the information on the power-supply-OFF instruction. The second control module 301 performs control to turn off the power supply of the imaging device on the basis of the information on a power-supply-OFF instruction.

By performing step S195, the process shown in FIGS. 7 to 10 ends.

The first imaging-setting information and the second imaging-setting information may be simultaneously generated on the basis of changed content of the imaging-setting of the master imaging device 30. Steps S180 and S195 are not essential.

Steps S100, S105, and S115 are not essential. For example, information on the imaging device that is a control target and information on the master imaging device 30 may be input to the input module 208, and the input information may be stored in the storage module 203.

Changing the second imaging-setting information of the master imaging device 30 is not essential. For example, steps S145 and S150 may not be performed. In step S160, the first control module 202 (the generation unit 205) may generate the first imaging-setting information of the slave imaging device 40 by reflecting the changed content detected in step S140 in the second imaging-setting information stored in the storage module 203.

As described above, the user can change the settings of an aperture, a focal length, sensitivity, white balance, shutter speed, an imaging distance, exposure, and image processing parameters on the basis of the through image.

The user can change settings of an imaging mode on the basis of the through image. For example, when the user desires to change a depth of field, the user can change the imaging mode into an aperture-priority mode. In the aperture-priority mode, a value of the shutter speed is set so that the exposure is appropriate in conjunction with a set value of the aperture. When a subject is blurred in the through image, the user can change the imaging mode to a shutter-speed-priority mode. In the shutter-speed-priority mode, the value of the aperture is set so that the exposure is appropriate in conjunction with a set value of the shutter speed.

The user can change a setting of time on the basis of the through image. For example, exchangeable image file format (EXIF) information is added to the through image data. The EXIF information includes time information. The through image and the time indicated by the time information are displayed on the display module 207. When the displayed time is incorrect, the user inputs an instruction indicating changing the imaging-setting regarding the time to the input module 208. The imaging control device 20 generates the first imaging-setting information and the second imaging-setting information based on an internal time of the imaging control device 20 on the basis of the instruction input to the input module 208 by the user.

The user can change a setting of continuous imaging on the basis of the through image. For example, when a subject, that is, a moving object that the user desires to continuously image is included in the through image, the user can change the imaging-setting so that the master imaging device 30 and the slave imaging device 40 perform continuous imaging.

The user can change a setting regarding selection of a still image and a moving image on the basis of the through image. For example, when a subject that the user desires to image as a moving image is included in the through image, the user can change the imaging-setting so that the master imaging device 30 and the slave imaging device 40 perform moving image capturing. For example, when a moving object or a changing subject (such as fireworks) is included in the through image, the imaging-setting is changed as described above.

As described above, the imaging control device 20 can generate the first imaging-setting information on the basis of changed content of the imaging-setting.

FIG. 13 shows a procedure of a process of the imaging control device 20 including a second process. A detailed process of the imaging control device 20 will be described.

The imaging control device 20 performs the process shown in FIGS. 13 and 8. In FIG. 13, a process different from that shown in FIG. 7 will be described.

After step S125, the first control module 202 performs control to start reception of the through image data of the master imaging device 30 using the first communication module 200 (step S400). Thus, in step S400, the first communication module 200 starts to receive the through image data of the master imaging device 30. In step S130, the first communication module 200 receives through image data of a first frame (first image data) from the master imaging device 30. After step S400, the same process as described above is performed in a step which is not shown. Thus, reception of through image data of the second and subsequent frames is performed.

In the master imaging device 30, the process corresponding to step S400 is performed. The second control module 301 instructs the imaging module 300 to start imaging. Thus, the imaging module 300 starts imaging to generate the through image data of the first frame. The second control module 301 performs control to transmit the through image data of the first frame to the imaging control device 20 using the third communication module 302. Thus, the third communication module 302 transmits the through image data of the first frame to the imaging control device 20. Further, the imaging module 300 sequentially generates through image data of the second and subsequent frames. The generated through image data is sequentially transmitted to the imaging control device 20.

After step S400, the first control module 202 (the generation unit 205) analyzes the through image data (step S405). In step S405, the first control module 202 (the generation unit 205) calculates an average pixel value of the through image data.

After step S405, the first control module 202 (the generation unit 205) determines whether or not the average pixel value of the through image data is out of a predetermined range (step S410). In step S410, when the average pixel value is within the predetermined range, step S155 is performed.

In step S410, when the average pixel value is out of the predetermined range, the first control module 202 (the generation unit 205) performs control to obtain the current second imaging-setting information from the master imaging device 30 using the second communication module 201 (step S415). In step S415, the first control module 202 (the generation unit 205) performs control to transmit an instruction to transmit the second imaging-setting information to the master imaging device 30 using the second communication module 201. Thus, the second communication module 201 transmits the instruction to transmit the second imaging-setting information to the master imaging device 30. The instruction to transmit the second imaging-setting information is information for instructing the master imaging device 30 to transmit the latest second imaging-setting information. Further, the first control module 202 (the generation unit 205) performs control to receive the current second imaging-setting information from the master imaging device 30 using the second communication module 201. Thus, the second communication module 201 receives the current second imaging-setting information from the master imaging device 30. The received current second imaging-setting information is stored in the storage module 203.

In the master imaging device 30, the process corresponding to step S415 is performed. The second control module 301 performs control to receive the instruction to transmit the second imaging-setting information using the fourth communication module 303. Thus, the fourth communication module 303 receives the instruction to transmit the second imaging-setting information. The second control module 301 performs control to transmit the current second imaging-setting information using the fourth communication module 303 on the basis of the instruction to transmit the second imaging-setting information. Thus, the fourth communication module 303 transmits the current second imaging-setting information to the imaging control device 20.

After step S415, the first control module 202 (the generation unit 205) calculates a changed amount of the imaging-setting (exposure) so that the average pixel value of the through image data is within the predetermined range on the basis of the current second imaging-setting information (step S420).

After step S420, the first control module 202 (the generation unit 205) generates new second imaging-setting information for the master imaging device 30 on the basis of the current second imaging-setting information and the changed amount of the imaging-setting calculated in step S420 (step S425). That is, in step S425, the first control module 202 (the generation unit 205) generates the first imaging-setting information from the second imaging-setting information on the basis of the analysis result of the through image data. The generated first imaging-setting information is stored in the storage module 203.

After step S425, step S150 is performed. In step S155, when the setting button B2 is not pressed, step S405 is performed. When the instruction to change the imaging-setting has been input in step S185, step S405 is performed.

Figure 7:
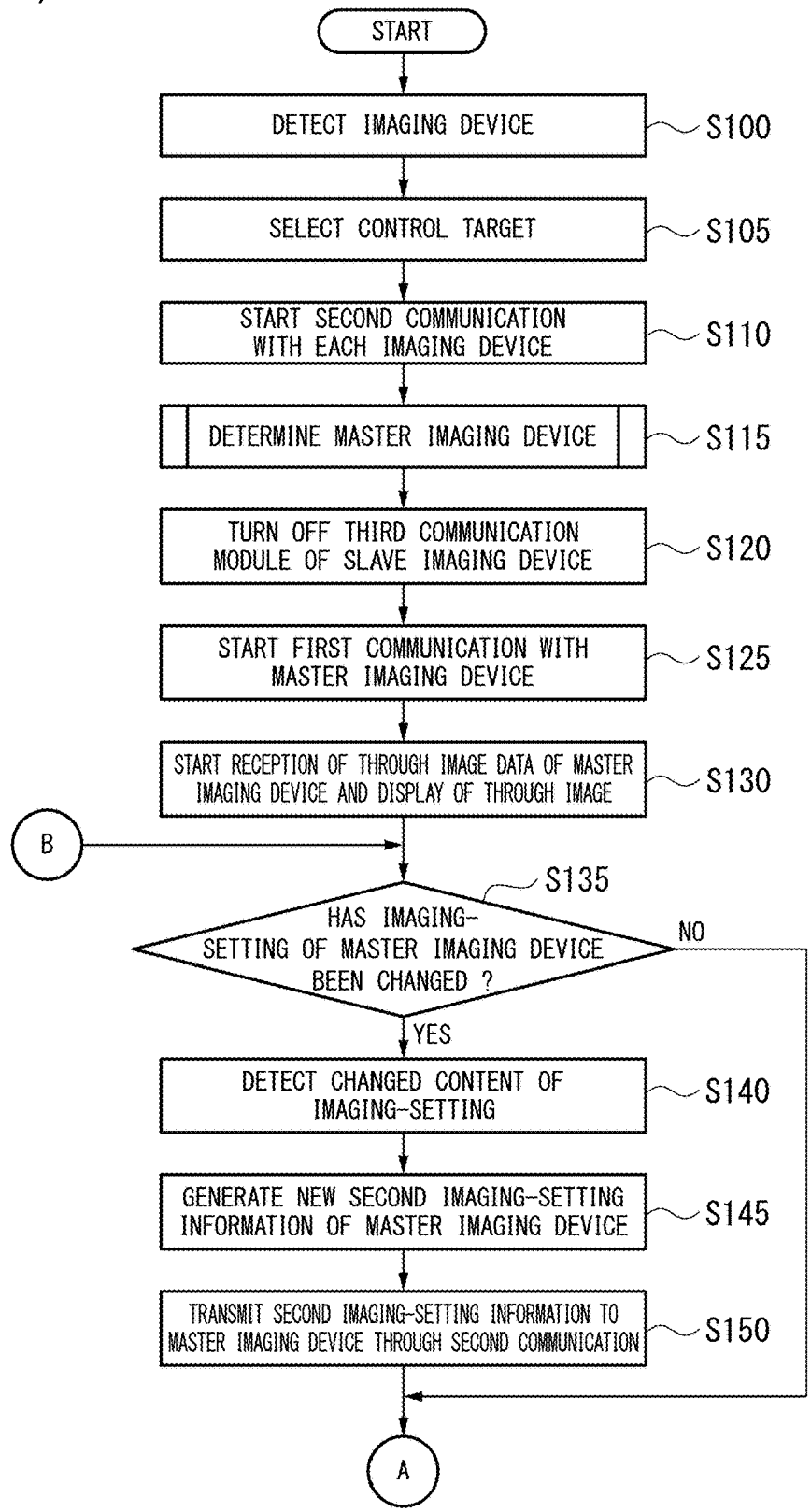
FIG. 7 is a flowchart showing a processing procedure of the imaging control device of the embodiment of the present invention.

In respects other than the above, the process shown in FIG. 13 is the same as the process shown in FIG. 7.

Changing the second imaging-setting information of the master imaging device 30 is not essential. For example, steps S415, S425, and S150 may not be performed. In step S160, the first control module 202 (the generation unit 205) may generate the first imaging-setting information of the slave imaging device 40 on the basis of the second imaging-setting information stored in the storage module 203 and the changed amount of the imaging-setting calculated in step S420.

As described above, the imaging control device 20 can change the settings of an aperture, a focal length, sensitivity, white balance, shutter speed, an imaging distance, exposure, and image processing parameters on the basis of the analysis result of the through image data.

The imaging control device 20 can change the setting of the imaging mode on the basis of the analysis result of the through image data. For example, when it is determined that a depth of field is desired to be changed, imaging control device 20 can change the imaging mode to the aperture-priority mode. When a subject is blurred in the through image, the imaging control device 20 can change the imaging mode to a shutter-speed-priority mode.

The imaging control device 20 can change a setting of time on the basis of the analysis result of the through image data. For example, EXIF information is added to the through image data. The EXIF information includes time information. When the time indicated by the time information and the internal time of the imaging control device 20 are not the same, the imaging control device 20 generates the first imaging-setting information and the second imaging-setting information based on an internal time of the imaging control device 20.

The imaging control device 20 can change a setting of continuous imaging on the basis of the analysis result of the through image data. For example, when a subject, that is, a moving object is included in the through image, the imaging control device 20 can change the imaging-setting so that the master imaging device 30 and the slave imaging device 40 perform continuous imaging.

The imaging control device 20 can change a setting regarding selection of a still image and a moving image on the basis of the analysis result of the through image data. For example, when a subject suitable for moving image capturing is included in the through image, the imaging control device 20 can change the imaging-setting so that the master imaging device 30 and the slave imaging device 40 perform moving image capturing. For example, when a moving object or a changing subject (such as fireworks) is included in the through image, the imaging-setting is changed as described above.

As described above, the imaging control device 20 can generate the first imaging-setting information on the basis of changed content of the imaging-setting.

The new second imaging-setting information may be generated as follows. For example, the second imaging-setting information may be generated so that brightness of a face in an image becomes predetermined brightness. In this case, in a step corresponding to step S405, the first control module 202 (the generation unit 205) detects a face area on the basis of the through image data, and calculates an average pixel value of the face area. In a step corresponding to step S410, the first control module 202 (the generation unit 205) determines whether or not the average pixel value of the face area is out of a predetermined range. When the average pixel value of the face area is out of the predetermined range, the first control module 202 (the generation unit 205) calculates a changed amount of imaging-setting (exposure) so that the average pixel value of the face area is within the predetermined range on the basis of the current second imaging-setting information in a step corresponding to step S420.

The second imaging-setting information may be generated so that brightness of an image becomes brightness according to a scene. In this case, a step corresponding to step S405, the first control module 202 (the generation unit 205) detects a scene on the basis of the through image data and calculates an average pixel value of the through image data. In a step corresponding to step S410, the first control module 202 (the generation unit 205) determines whether or not the average pixel value of the through image data is out of a predetermined range according to the scene. When the average pixel value of the through image data is out of the predetermined range according to the scene, the first control module 202 (the generation unit 205) calculates a changed amount of imaging-setting (exposure) so that the average pixel value of the through image data is within the predetermined range according to the scene on the basis of the current second imaging-setting information in a step corresponding to step S420.

The second imaging-setting information may be generated to avoid overexposure. In this case, in a step corresponding to step S405, the first control module 202 (the generation unit 205) detects an area in which overexposure occurs on the basis of the through image data. In a step corresponding to step S410, the first control module 202 (the generation unit 205) determines whether or not there is an area in which overexposure occurs in the through image data. When there is an area in which overexposure occurs, the first control module 202 (the generation unit 205) calculates a changed amount of the imaging-setting (exposure) so that overexposure does not occur on the basis of the current second imaging-setting information in a step corresponding to step S420.

The second imaging-setting information may be generated so that a dynamic range becomes wider. In this case, in a step corresponding to step S405, the first control module 202 (the generation unit 205) calculates a ratio between a maximum pixel value and a minimum pixel value on the basis of the through image data. In a step corresponding to step S410, the first control module 202 (the generation unit 205) determines whether or not the ratio between the maximum pixel value and the minimum pixel value is smaller than or equal to a predetermined value. When the ratio between the maximum pixel value and the minimum pixel value is smaller than or equal to the predetermined value, the first control module 202 (the generation unit 205) calculates a changed amount of the imaging-setting (exposure) so that the ratio between the maximum pixel value and the minimum pixel value is greater than or equal to the predetermined value on the basis of the current second imaging-setting information in a step corresponding to step S420.

The second imaging-setting information may be generated so that a contrast of the image is further improved. In this case, in a step corresponding to step S405, the first control module 202 (the generation unit 205) calculates a contrast value on the basis of the through image data. In a step corresponding to step S410, the first control module 202 (the generation unit 205) determines whether or not the contrast value is smaller than or equal to a predetermined value. When the contrast value is smaller than or equal to the predetermined value, the first control module 202 (the generation unit 205) calculates a changed amount of the imaging-setting (an aperture or a focal length) so that the contrast value is greater than or equal to the predetermined value on the basis of the current second imaging-setting information in a step corresponding to step S420.

The second imaging-setting information may be generated so that a white portion in the image becomes whiter. In this case, in a step corresponding to step S405, the first control module 202 (the generation unit 205) detects a white area on the basis of the through image data, and calculates an average pixel value of the white area. In a step corresponding to step S410, the first control module 202 (the generation unit 205) determines whether or not the average pixel value of the white area is out of a predetermined range. When the average pixel value of the white area is out of the predetermined range, the first control module 202 (the generation unit 205) calculates a changed amount of the imaging-setting (exposure) so that the average pixel value of the white area is within a predetermined range on the basis of the current second imaging-setting information in a step corresponding to step S420. Alternatively, in a step corresponding to step S405, the first control module 202 (the generation unit 205) detects the white area on the basis of the through image data and calculates a ratio of the RGB pixel values of the white area. In a step corresponding to step S410, the first control module 202 (the generation unit 205) determines whether or not the ratio of the RGB pixel values of the white area is out of a predetermined range. When the ratio of the RGB pixel values of the white area is out of the predetermined range, the first control module 202 (the generation unit 205) calculates the changed amount of the imaging-setting (white balance) so that the ratio of the RGB pixel values of the white area is within the predetermined range on the basis of the current second imaging-setting information in a step corresponding to step S420.

The second imaging-setting information may be generated so that blurring is reduced. In this case, in a step corresponding to step S405, the first control module 202 (the generation unit 205) calculates the amount of movement of a subject on the basis of the through image data. In a step corresponding to step S410, the first control module 202 (the generation unit 205) determines whether or not the amount of movement is larger than or equal to a predetermined amount. When the amount of movement is larger than or equal to the predetermined amount, the first control module 202 (the generation unit 205) calculates a changed amount of the imaging-setting (shutter speed) so that the amount of movement is smaller than or equal to the predetermined amount on the basis of the current second imaging-setting information in a step corresponding to step S420.

The second imaging-setting information may be generated so that a size of a face is a predetermined size. In this case, in a step corresponding to step S405, the first control module 202 (the generation unit 205) detects a face area on the basis of the through image data and calculates the size of the face area. In a step corresponding to step S410, the first control module 202 (the generation unit 205) determines whether or not the size of the face area is smaller than or equal to a predetermined size. When the size of the face area is smaller than or equal to the predetermined size, the first control module 202 (the generation unit 205) calculates a changed amount of the imaging-setting (a focal distance) so that the size of the face area is larger than or equal to the predetermined size on the basis of the current second imaging-setting information in a step corresponding to step S420.

The first control module 202 may obtain hardware information on the plurality of imaging devices through communication in the second operation mode, and perform control to display a warning when the hardware information on the plurality of imaging devices do not satisfy a criterion. For example, when exchangeable lenses are mounted on the plurality of imaging devices and the lenses mounted on the respective imaging devices are different, warnings may be displayed. Alternatively, when the lenses mounted on the respective imaging devices do not satisfy a predetermined condition, warnings may be displayed.

The first control module 202 may obtain state information of a plurality of imaging devices through communication in the second operation mode, and perform control to display a warning when the state information of the plurality of imaging devices does not satisfy a criterion. For example, when a battery level of each imaging device is lower than or equal to a predetermined level, a warning may be displayed. Alternatively, when a plurality of imaging devices include a storage medium that stores image data and a capacity of the image data stored in the storage medium reaches a storable capacity, a warning may be displayed.

According to the embodiment of the present invention, the imaging control device 20 includes the first communication module 200, the second communication module 201, and the generation unit 205. The master imaging device 30 and the slave imaging device 40 include the imaging module 300, the second control module 301, the third communication module 302, and the fourth communication module 303. The imaging control device of each aspect of the present invention may not have a configuration corresponding to at least one of the determination unit 206, the storage module 203, and the interface 204.

According to the embodiment of the present invention, the imaging control device 20 executes the first step (step S125), the second step (step S110), the third step (steps S130 and S400), the fourth step (steps S160, S405, and S420), and the fifth step (step S165). The first step is a step of establishing a communication connection at the data link level with the master imaging device 30 using the first communication module 200. The second step is a step of establishing a communication connection of the two or more slave imaging devices 40 at the data link level using the second communication module 201. The third step is a step of receiving the first image data from the master imaging device 30 using the first communication module 200. The first image data is generated by the master imaging device 30 on the basis of the second imaging-setting information. The fourth step is a step of generating the first imaging-setting information from the second imaging-setting information stored in the storage module 203. The fifth step is a step of transmitting the first imaging-setting information to the two or more slave imaging devices 40 using the second communication module 201.

The fourth step is a step of performing any one of the first process and the second process. The first process is a process of generating the first imaging-setting information from the second imaging-setting information stored in the storage module 203 on the basis of the first instruction input to the input module 208 after an image is displayed on the basis of the first image data by the display module 207. The first instruction is an instruction regarding the imaging-setting. The second process is a process of analyzing the first image data and generating the first imaging-setting information from the second imaging-setting information stored in the storage module 203 on the basis of the analysis result of the first image data.

The imaging control method and the program of each aspect of the present invention may not include the steps other than steps corresponding to steps S110, S125, S130, S160, S165, S405, and S420.

In the embodiment of the present invention, the imaging control device 20 can reduce the amount of usage of a communication band and can perform imaging-settings of a plurality of imaging devices at high speed.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An imaging control device which controls three or more imaging devices, the imaging control device comprising:
   a first communication module configured to perform communication in a first operation mode;
   a second communication module configured to perform communication in a second operation mode; and
   a generation unit configured to generate first imaging-setting information,
   wherein the first operation mode is an operation mode in which one node is unable to simultaneously maintain a communication connection with a plurality of nodes at a data link level,
   the second operation mode is an operation mode in which one node is able to simultaneously maintain a communication connection with a plurality of nodes at the data link level,
   a communication speed in the first operation mode is higher than a communication speed in the second operation mode,
   one of the three or more imaging devices is defined as a master imaging device,
   two or more of the imaging devices other than the master imaging device among the three or more imaging devices are defined as slave imaging devices,
   the first communication module establishes a communication connection at the data link level with the master imaging device,
   the second communication module establishes a communication connection at the data link level with the two or more slave imaging devices,
   the first communication module receives first image data from the master imaging device, the first image data being generated by the master imaging device on the basis of second imaging-setting information,
   the generation unit generates the first imaging-setting information from the second imaging-setting information stored in a storage module, and
   the second communication module transmits the first imaging-setting information to the two or more slave imaging devices.

2. The imaging control device according to claim 1, wherein the generation unit performs any one of a first process and a second process,
   in the first process, the generation unit generates the first imaging-setting information from the second imaging-setting information stored in the storage module on the basis of a first instruction input to an input module after an image based on the first image data is displayed by a display module, the first instruction being an instruction regarding imaging-setting, and
   in the second process, the generation unit analyzes the first image data and generates the first imaging-setting information from the second imaging-setting information stored in the storage module on the basis of an analysis result of the first image data.

3. The imaging control device according to claim 1, wherein the three or more imaging devices include
   a third communication module configured to perform communication in the first operation mode, and
   a fourth communication module configured to perform communication in the second operation mode,
   the third communication module is able to enter each of a first state and a second state,
   the first state is a normal state,
   the second state is any one of a state in which the third communication module operates with power consumption less than power consumption in the normal state and a state in which the third communication module stops an operation, and
   the second communication module transmits instruction information indicating an instruction to set the third communication module to the second state to the two or more slave imaging devices.

4. The imaging control device according to claim 2, further comprising:
   a determination unit,
   wherein the second communication module receives second image data generated by the three or more imaging devices from the three or more imaging devices,
   the determination unit determines, as the master imaging device, the imaging device that has generated the second image data indicated by a second instruction input to the input module, after the image based on the second image data is displayed by the display module, and
   the second instruction is an instruction to select the second image data generated by any one of the three or more imaging devices.

5. An imaging system, comprising:
   an imaging control device, and
   three or more imaging devices,
   wherein the imaging control device includes
   a first communication module configured to perform communication in a first operation mode;
   a second communication module configured to perform communication in a second operation mode; and
   a generation unit configured to generate first imaging-setting information,
   the first operation mode is an operation mode in which one node is unable to simultaneously maintain a communication connection with a plurality of nodes at a data link level, the second operation mode is an operation mode in which one node is able to simultaneously maintain a communication connection with a plurality of nodes at the data link level, a communication speed in the first operation mode is higher than a communication speed in the second operation mode, one of the three or more imaging devices is defined as a master imaging device, two or more of the imaging devices other than the master imaging device among the three or more imaging devices are defined as slave imaging devices, the first communication module establishes a communication connection at the data link level with the master imaging device, the second communication module establishes a communication connection at the data link level with the two or more slave imaging devices, the first communication module receives first image data from the master imaging device, the first image data being generated by the master imaging device on the basis of second imaging-setting information, the generation unit generates the first imaging-setting information from the second imaging-setting information stored in a storage module, the second communication module transmits the first imaging-setting information to the two or more slave imaging devices, the three or more imaging devices include
  an imaging module configured to generate the first image data;
  a control module configured to control the imaging module;
  a third communication module configured to perform communication in the first operation mode; and
  a fourth communication module configured to perform communication in the second operation mode, the third communication module of the master imaging device transmits the first image data to the imaging control device, the fourth communication module of two or more slave imaging devices receives the first imaging-setting information from the imaging control device, and the control module of the two or more slave imaging devices performs imaging-setting of the imaging module on the basis of the first imaging-setting information.

6. An imaging control method in which an imaging control device which controls three or more imaging devices executes a first step, a second step, a third step, a fourth step, and a fifth step, wherein the imaging control device includes
  a first communication module configured to perform communication in a first operation mode; and
  a second communication module configured to perform communication in a second operation mode;

the first operation mode is an operation mode in which one node is unable to simultaneously maintain a communication connection with a plurality of nodes at a data link level, the second operation mode is an operation mode in which one node is able to simultaneously maintain a communication connection with a plurality of nodes at the data link level, a communication speed in the first operation mode is higher than a communication speed in the second operation mode, one of the three or more imaging devices is defined as a master imaging device, two or more of the imaging devices other than the master imaging device among the three or more imaging devices are defined as slave imaging devices, the first step is a step of establishing a communication connection at the data link level with the master imaging device using the first communication module, the second step is a step of establishing a communication connection at the data link level with the two or more slave imaging devices using the second communication module, the third step is a step of receiving first image data from the master imaging device using the first communication module, the first image data being generated by the master imaging device on the basis of second imaging-setting information, the fourth step is a step of generating the first imaging-setting information from the second imaging-setting information stored in a storage module, and the fifth step is a step of transmitting the first imaging-setting information to the two or more slave imaging devices using the second communication module.

7. A non-transitory computer readable recording medium saving a program for causing a computer of an imaging control device which controls three or more imaging devices to execute a first step, a second step, a third step, a fourth step, and a fifth step, wherein the imaging control device includes
  a first communication module configured to perform communication in a first operation mode; and
  a second communication module configured to perform communication in a second operation mode;

the first operation mode is an operation mode in which one node is unable to simultaneously maintain a communication connection with a plurality of nodes at a data link level, the second operation mode is an operation mode in which one node is able to simultaneously maintain a communication connection with a plurality of nodes at the data link level, a communication speed in the first operation mode is higher than a communication speed in the second operation mode, one of the three or more imaging devices is defined as a master imaging device, two or more of the imaging devices other than the master imaging device among the three or more imaging devices are defined as slave imaging devices, the first step is a step of establishing a communication connection at the data link level with the master imaging device using the first communication module, the second step is a step of establishing a communication connection at the data link level with the two or more slave imaging devices using the second communication module, the third step is a step of receiving first image data from the master imaging device using the first communication module, the first image data being generated by the master imaging device on the basis of second imaging-setting information, the fourth step is a step of generating the first imaging-setting information from the second imaging-setting information stored in a storage module, and the fifth step is a step of transmitting the first imaging-setting information to the two or more slave imaging devices using the second communication module.

* * * * *